(12) United States Patent
McCombe et al.

(10) Patent No.: US 8,237,711 B2
(45) Date of Patent: Aug. 7, 2012

(54) TRACING OF SHADER-GENERATED RAY GROUPS USING COUPLED INTERSECTION TESTING

(75) Inventors: James Alexander McCombe, San Francisco, CA (US); Ryan R. Salsbury, San Francisco, CA (US); Luke Tilman Peterson, Park City, UT (US)

(73) Assignee: Caustic Graphics, Inc., San Francisco, CA (US)

( * ) Notice: Subject to any disclaimer, the term of this patent is extended or adjusted under 35 U.S.C. 154(b) by 1270 days.

(21) Appl. No.: 11/942,336

(22) Filed: Nov. 19, 2007

(65) Prior Publication Data

US 2009/0128562 A1    May 21, 2009

(51) Int. Cl.
*G06T 15/10* (2006.01)
*G06T 15/20* (2006.01)
(52) U.S. Cl. ............ 345/427; 345/418; 345/421
(58) Field of Classification Search .......... None
See application file for complete search history.

(56) References Cited

U.S. PATENT DOCUMENTS

| | | | |
|---|---|---|---|
| 4,625,289 A | 11/1986 | Rockwood | |
| 5,313,568 A | 5/1994 | Wallace | |
| 5,933,146 A | 8/1999 | Wrigley | |
| 5,973,699 A | 10/1999 | Kent | |
| 5,990,896 A | 11/1999 | Barrus | |
| 6,023,279 A | 2/2000 | Sowizral et al. | |
| 6,028,608 A | 2/2000 | Jenkins | |
| 6,111,582 A | 8/2000 | Jenkins | |
| 6,344,837 B1 | 2/2002 | Gelsey | |
| 6,489,955 B1 | 12/2002 | Newhall, Jr. | |
| 6,556,200 B1 | 4/2003 | Pfister et al. | |
| 6,559,843 B1 | 5/2003 | Hsu | |
| 6,731,304 B2 | 5/2004 | Sowizral et al. | |

(Continued)

FOREIGN PATENT DOCUMENTS

WO    WO/96/17326 A1    6/1996

(Continued)

OTHER PUBLICATIONS

M.L. Anido, N. Tabrizi, H. Du, M. Sanchez-Elez M and N. Bagherzadeh, "Interactive Ray Tracing Using a SIMD Reconfigurable Architecture," Proceedings of the 14th Symposium on Computer Architecture and High Performance Computing, 2002, p. 20-28.

(Continued)

*Primary Examiner* — Said Broome
(74) *Attorney, Agent, or Firm* — Michael S. Garrabrants; ArtesynIP, Inc.

(57) ABSTRACT

For ray tracing scenes composed of primitives, systems and methods accelerate ray/primitive intersection identification by testing rays against elements of geometry acceleration data (GAD) in a parallelized intersection testing resource. Groups of rays can be described as shared attribute information and individual ray data for efficient ray data transfer between a host processor and the testing resource. The host processor also hosts shading and/or management processes controlling the testing resource and adapting the ray tracing, as necessary or desirable, to meet criteria, while reducing degradation of rendering quality. The GAD elements can be arranged in a graph, and rays can be collected into collections based on whether a ray intersects a given element. When a collection is deemed ready for further testing, it is tested for intersection with GAD elements connected, in the graph, to the given element. The graph can be hierarchical such that rays of a given collection are tested against children of the GAD element associated with the given collection.

33 Claims, 13 Drawing Sheets

U.S. PATENT DOCUMENTS

| | | | |
|---|---|---|---|
| 7,009,608 | B2 | 3/2006 | Pharr et al. |
| 7,012,604 | B1 | 3/2006 | Christie et al. |
| 7,030,879 | B1 | 4/2006 | Pharr |
| 7,071,938 | B2 | 7/2006 | Herken et al. |
| 7,098,907 | B2 | 8/2006 | Houston et al. |
| 7,212,207 | B2 | 5/2007 | Green |
| 7,250,948 | B2 | 7/2007 | Hayes |
| 7,289,118 | B2 | 10/2007 | Schmittler et al. |
| 7,348,975 | B2 | 3/2008 | Reshetov et al. |
| 7,362,332 | B2 | 4/2008 | Gritz |
| 7,479,962 | B2 | 1/2009 | Herken et al. |
| 7,483,024 | B2 | 1/2009 | Maillot |
| 7,688,320 | B2 | 3/2010 | Shearer |
| 7,782,318 | B2 | 8/2010 | Shearer |
| 7,830,379 | B2 | 11/2010 | Peterson et al. |
| 2004/0249809 | A1 | 12/2004 | Ramani et al. |
| 2005/0264568 | A1 | 12/2005 | Keller |
| 2006/0098009 | A1 | 5/2006 | Zuniga |
| 2006/0139350 | A1 | 6/2006 | Reshetov |
| 2007/0035545 | A1 | 2/2007 | Hempel et al. |
| 2007/0132754 | A1 | 6/2007 | Reshetov et al. |
| 2008/0024489 | A1 | 1/2008 | Shearer |
| 2008/0028154 | A1 | 1/2008 | Hoover |
| 2008/0028403 | A1 | 1/2008 | Hoover |
| 2008/0049017 | A1 | 2/2008 | Shearer |
| 2008/0074420 | A1 | 3/2008 | Kuesel |
| 2008/0074421 | A1 | 3/2008 | Hayes |
| 2008/0088622 | A1 | 4/2008 | Shearer |
| 2008/0122841 | A1 | 5/2008 | Brown |
| 2008/0122845 | A1 | 5/2008 | Brown et al. |
| 2008/0129734 | A1 | 6/2008 | Seung-Woo et al. |
| 2008/0180442 | A1 | 7/2008 | Brown et al. |
| 2008/0211804 | A1 | 9/2008 | Hempel et al. |
| 2009/0102844 | A1 | 4/2009 | Deparis |
| 2009/0189898 | A1 | 7/2009 | Dammertz et al. |
| 2010/0194751 | A1 | 8/2010 | Wald et al. |

FOREIGN PATENT DOCUMENTS

| | | | |
|---|---|---|---|
| WO | WO 2008/037599 | A1 | 4/2008 |

OTHER PUBLICATIONS

A.J. van der Ploeg, "Interactive Ray Tracing, the replacement of rasterization?" B.Sc. thesis, VU University Amsterdam, The Netherlands, Dec. 2006. (Available at http://www.cs.vu.nl/~kielmann/theses/avdploeg.pdf, last visited on Mar. 31, 2008).

H. Du, M. Sanchez-Elez, N. Tabrizi, N. Bagherzadeh, M.L. Anido and M. Fernandez, "Interactive Ray Tracing on Reconfigurable SIMD MorphoSys," Proceedings of the Design, Automation and Test in Europe Conference and Exhibition, 2003, Asia and South Pacific Jan. 21-24, 2003, pp. 471-476.

M. Sanchez-Elez, H. Du, N. Tabrizi, Y. Long, N. Bagherzadeh and M. Fernandez, "Algorithm Optimizations and Mapping Scheme for Interactive Ray Tracing on a Reconfigurable Architecture," Computers & Graphics 27(5), 2003, pp. 701-713.

Jeffrey A. Mahovsky, "Ray-Tracing with Reduced-Precision Bounding Volume Hierarchies," PhD thesis, University of Calgary, Alberta, Canada, 2005. (Available at http://pages.cpsc.ucalgary.ca/~brosz/theses/PhD%20Thesis%20-%202005%20-%20Jeffrey%20Mahovsky%20-%20Ray%20Tracing%20with%20Reduced-Precision%20Bounding%20Volume%20Hierarchies.pdf, last visited on Mar. 31, 2008).

J. Fender and J. Rose, "A High-Speed Ray Tracing Engine Built on a Field-Programmable System," Proceedings of the 2003 IEEE International Conference on Field-Programmable Technology (FPT), Dec. 15-17, 2003, pp. 188-195.

Carsten Benthin, PhD thesis: "Realtime Ray Tracing on Current CPU Architectures," Saarland University, Saarbrücken, Germany, Jan. 2006. (Available at graphics.cs.uni-sb.de/~benthin/phd.pdf, last visited on Jan. 7, 2008 ).

J.G. Cleary, B.M. Wyvill, G.M. Birtwistle and R. Vatti, "Multiprocessor Ray Tracing," Computer Graphics Forum, vol. 5, issue 1, pp. 3-12, 1986.

H. Friedrich, J. Günther, A. Dietrich, M. Scherbaum, H-P Seidel and P. Slusallek, "Exploring the Use of Ray Tracing for Future Games," Proceedings of the 2006 ACM SIGGRAPH symposium on Videogames, Boston, MA, pp. 41-50, 2006.

N. Thrane and L.O. Simonsen, "A Comparison of Acceleration Structures for GPU Assisted Ray Tracing", Masters thesis, University of Aarhus, Denmark, Aug. 1, 2005. (Available at http://www.larsole.com/files/GPU_BVHthesis.pdf, last visited on Jan. 7, 2008.).

I. Wald, P. Slusallek, C. Benthin and M. Wagner, "Interactive Rendering with Coherent Ray Tracing," Computer Graphics Forum, Proceedings of EUROGRAPHICS 2001, vol. 20, No. 3, 2001.

G. Humphreys and C.S. Ananian, "TigerSHARK: A Hardware Accelerated Ray-Tracing Engine," Technical report, Princeton University, Princeton, NJ, May 14, 1996, (Available at citeseer.ist.psu.edu/article/humphreys96tigershark.html, last visited on Jan. 7, 2008.).

M. Pharr, C. Kolb, R. Gershbein and P. Hanrahan, "Rendering Complex Scenes with Memory-Coherent Ray Tracing," in Computer Graphics, vol. 31, pp. 101-108, Aug. 1997, ACM Siggraph 1997 Conference Proceedings.

Geoff Wyvill, "Practical Ray Tracing," Computer Graphics International 1995, Tutorial notes.

I. Wald and P. Slusallek, "State of the Art in interactive Ray Tracing," In State of the Art Reports, EUROGRAPHICS 2001, pp. 21-42, 2001.

I. Wald, P. Slusallek and C. Benthin, "Interactive Distributed Ray Tracing of Highly Complex Models," Rendering Techniques 2001—Proceedings of the 12th EUROGRAPHICS Workshop on Rendering, pp. 274-285, London, England, Jun. 2001.

E. Månsson, J. Munkberg and T. Akenine-Möller, "Deep Coherent Ray Tracing," RT 07—Symposium on Interactive Ray Tracing 2007, Sep. 10-12, 2007, pp. 79-85. (Available at http://graphics.cs.lth.se/research/papers/2007/deepcoh/deepcoherent.pdf, last visited Jan. 7, 2008.).

W.R. Mark and D. Fussell, "Real-Time Rendering Systems in 2010," The University of Texas at Austin, Department of Computer Sciences, Technical Report # TR-05-18, May 2, 2005. (Available at http://www-csl.csres.utexas.edu/users/billmark/papers/rendering2010-TR/TR05-18-Rendering2010.pdf, last visited Jan. 7, 2008.).

P.A. Navrátil, D.S. Fussell and C. Lin, "Dynamic Ray Scheduling for Improved System Performance," The University of Texas at Austin, Department of Computer Sciences, Technology Report #TR-07-19, Apr. 12, 2007. (Available at http://www.cs.utexas.edu/~pnav/papers/utcs-tr-07-19/utcs-tr-07-19,pdf, last visited Jan. 7, 2008.).

Wilfrid Lefer "An Efficient Parallel Ray Tracing Scheme for Distributed Memory Parallel Computers," Oct. 25, 1993, Parallel Rendering Symposium, 1993 San Jose, CA, USA Oct. 25-26, 1993, New York, NY, USA, IEEE, pp. 77-80.

A. Augusto de Sousa and F. Nunes Ferreira, "A Scalable Implementation of an Interactive Increasing Realism Ray-Tracing Algorithm," Vector and Parallel Processing—VECPAR '96, Second International Conference on Vector and Parallel Processing—Systems and Applications, Selected Papers Springer-Verlag Berlin, Germany, 1997, pp. 458-469.

Eric Haines, Ray Tracing News: "Light Makes Right," vol. 3, No. 1, Jan. 2, 1990, Retrieved from the Internet: URL:http://tog.acm.org/resources/RTNews/html/rtnv3n1.html (retrieved on Jul. 28, 2009.

E. Gröller and W. Purgathofer, "Coherence in Computer Graphics," Institute for Computer Graphics, Technical University Vienna, Vienna, Austria, Trans. on Information and Communication Technologies, vol. 5, 1993, WIT Press.

John Amanatides, "Ray Tracing with Cones," ACM SIGGRAPH Computer Graphics 18(3), Jul. 1984, pp. 129-135.

James Arvo and David Kirk, "Fast Ray Tracing by Ray Classification," ACM SIGGRAPH Computer Graphics 21(4), Jul. 1987, pp. 55-64.

Paul S. Heckbert and Pat Hanrahan, "Beam Tracing Polygonal Objects," ACM SIGGRAPH Computer Graphics 18(3), Jul. 1984, pp. 119-127.

Kenneth I. Joy and Murthy N. Bhetanabhotla, "Ray Tracing Parametric Surface Patches Utilizing Numerical Techniques and Ray Coherence," ACM SIGGRAPH Computer Graphics 20(4), Aug. 1985, pp. 279-285.

Masataka Ohta and Mamoru Maekawa, "Ray-bound tracing for perfect and efficient anti-aliasing," The Visual Computer: International Journal of Computer Graphics, vol, 6, issue 3, Springer Berlin / Heidelberg, May 1990, pp. 125-133.

M. Shinya, T. Takahashi and S. Naito, "Principles and Applications of Pencil Tracing," ACM SIGGRAPH Computer Graphics 21(4), Jul. 1987, pp. 45-54.

James Bigler, Abe Stephens and Steven G. Parker, "Design for Parallel Interactive Ray Tracing Systems," Proceedings of the IEEE Symposium on Interactive Ray Tracing, 2006, pp. 187-196.

Eric Haines, Ray Tracing News: "Light Makes Right" vol. 12, No. 2, Dec. 21, 1999. Retrieved from the Internet: http://tog.acm.org/resources/RTNews/html/rtnv12n2.html#art3 [retrieved on Mar. 10, 2008].

Sven Woof, Jörg Schmittler and Philipp Slusallek, "RPU: A Programmable Ray Processing Unit for Reaitime Ray Tracing," ACM Transactions on Graphics (TOG), vol. 24, Issue 3, (Jul. 2005), Proceedings of ACM SIGGRAPH 2005, session: Hardware rendering, pp. 434-444, 2005.

Jörg Schmittler, Ingo Wald, and Philipp Slusallek, "SaarCOR—A Hardware Architecture for Ray Tracing," Proceedings of the ACM SIGGRAPH/EUROGRAPHICS conference on Graphics hardware, Saarbrucken, Germany, Session: Ray tracing vs. scan conversion, pp. 27-36, 2002.

K. R. Subramanian and Donald S. Fussell, "A Search Structure based on K-d Trees for Efficient Ray Tracing," PhD thesis, The University of Texas at Austin, Dec. 1990.

Eric Larsen, Stefan Gottschalk, Ming C. Lin, and Dinesh Manocha, "Fast Distance Queries with Rectangular Swept Sphere Volumes," Proceedings of IEEE International Conference on Robotics and Automation, San Francisco, CA, 2000, vol. 4, pp. 3719-3726.

James T. Klosowski, Martin Held, Joseph S.B. Mitchell, Henry Sowizral and Karel Zikan, "Efficient Collision Detection Using Bounding Volume Hierarchies of k-DOPs," IEEE Transactions on Visualization and Computer Graphics, Jan. 1998, vol. 4, issue 1, pp. 21-36.

Hank Weghorst, Gary Hooper and Donald P. Greenberg, "Improved Computational Methods for Ray Tracing," ACM Transactions on Graphics (TOG), Jan. 1984, vol. 3, issue 1, pp. 52-69.

Frederic Cazals, George Drettakis and Claude Puech, "Filtering, Clustering and Hierarchy Construction: a New Solution for Ray-Tracing Complex Scenes," Computer Graphics Forum (Eurographics '95) 14, 3.

Christian Lauterbach, Sung-Eui Yoon, David Tuft and Dinesh Manocha, "RT-DEFORM: Interactive Ray Tracing of Dynamic Scenes using BVHs," In Proceedings of the 2006 IEEE Symposium on Interactive Ray Tracing, Salt Lake City, UT, Sep. 18-20, 2006.

Andreas Dietrich, Ingo Wald, Carsten Benthin and Philipp Slusallek, "The OpenRT Application Programming Interface—Towards A Common API for Interactive Ray Tracing—"Proceedings of the 2003 OpenSG Symposium (Darmstadt, Germany), Eurographics Association, 2003, pp. 23-31.

Andreas Dietrich, Ingo Wald, Carsten Benthin and Philipp Slusallek, "The OpenRT Application Programming Interface—Towards A Common API for Interactive Ray Tracing—"OpenSG 2003, Darmstadt, Germany (Available online at http://graphics.cs.uni-sb.de/fileadmin/cguds/papers/2003/opensg03/TheOpenRTAPI_OpenSG2003.ppt, last visited Sep. 21, 2009).

J. Hanika and A. Keller, "Towards Hardware Ray Tracing using Fixed Point Arithmetic," IEEE/EG Symposium on Interactive Ray Tracing, 2007, Sep. 10-12, 2007, Ulm, Germany, pp. 119-128.

I. Wald, C. Gribble, S. Boulos and A. Kensler, "SIMD Ray Stream Tracing—SIMD Ray Traversal with Generailzed Ray Packets and On-the-fly Re-Ordering," SCI Institue Technical Report No. UUSCI-2007-012, 2007.

David R. Chapman, "High Definition Interactive Animated Ray Tracing on CELL Processor using Coherent Grid Traversal," Class final project paper, CMSC 635: Advanced Computer Graphics, Computer Science and Electrical Engineering, University of Maryland, Baltimore County, Baltimore, MD (Available online at http://www.csee.umbc.edu/~olano/635s07/dchapm2.pdf, last visited on Oct. 30, 2009).

C. Benthin, I. Wald, M. Scherbaum and H. Friedrich,"Ray Tracing on the Cell Processor," IEEE Symposium on Interactive Ray Tracing 2006, Sep. 18-20, 2006, pp. 15-23, Salt Lake City, UT.

Eric Lafortune, "Mathematical Models and Monte Carlo Algorithms for Physically Based Rendering," Ph. D. thesis, Department of Computer Science, Faculty of Engineering, Katholieke Universiteit Leuven, Feb. 1996.

William J. Morokoff and Russell E. Caflisch, "Quasi-random sequences and Their discrepancies," SIAM Journal on Scientific Computing, vol. 15, Issue 6, Nov. 1994, pp. 1251-1279, Philadelphia, PA.

Peter Shirley, Changyaw Wang and Kurt Zimmerman "Monte Carlo Techniques for Direct Lighting Calculations," ACM Transactions on Graphics, vol. 15, Issue 1, Jan. 1996, pp. 1-36, ACM, New York, New York.

William J. Morokoff and Russel E. Caflisch, "Quasi-Monte Carlo Integration," Journal of Computational Physics, vol. 122, Issue 2, Dec. 1995, pp. 218-230,1995, published by Academic Press Professional, Inc., San Diego, CA.

Gerhard Hummer, Lawrence R. Pratt and Angel E. Garcia, "On the free energy of ionic hydration," The Journal of Physical Chemistry, 1995 (Available online at http://arxiv.org/PS_cache/chem-ph/pdf/9505/950550v1.pdf, last visited Oct. 30, 2009).

Stefan Heinrich and Alexander Keller, "Quasi-Monte Carlo Methods in Computer Graphics, Part II: The Radiance Equation," Technical Report 243/94, Fachbereich Informatik, AG Numerische Algorithmen, Universit at Kaisersiautern, 1994.

F. James, "Monte Carlo theory and practice," Reports on Progress in Physics, vol. 43, 1980, pp. 1145-1189, The Institute of Physics, Great Britain.

Stefan Heinrich and Alexander Keller, "Quasi-Monte Carlo Methods in Computer Graphics, Part I: The QMC Buffer," Technical Report 242/94, Fachbereich Informatik, AG Numerische Algorithmen, Universit at Kaiserslautern, 1994.

Russel E. Caflisch and Bradley Moskowitz, "Modified Monte Carlo Methods Using Quasi-Random Sequences," Lecture Notes in Statistics 106, Dec. 1994. Mathematics Department, UCLA, Los Angeles, CA.

P. A. Navrátil, D. S. Fussell, C. Lin and W. R. Mark, "Dynamic Ray Scheduling to Improve Ray Coherence and Bandwidth Utilization," IEEE Symposium on Interactive Ray Tracing, 2007, Sep. 10-12, 2007, pp. 95-104.

Susumu Horiguchi, Masayuki Katahira and Takeo Nakada, "Parallel processing of incremental ray tracing on a shared-memory multiprocessor," 1993, The Visual Computer, vol. 9, No. 7, pp. 371-380, Springer-Verlag.

P. H. Christensen, J. Fong, D. M. Laur and Dana Batali, "Ray Tracing for the Movie 'Cars'," IEEE Symposium on Interactive Ray Tracing, 2006, pp. 1-6.

Eric Haines, "Ray Tracing News: Light Makes Right" [Online], vol. 2, No. 8, Oct. 27, 1989. Retrieved from the Internet: URL:http://tog.acm.org/resources/RTNews/html/rtnews9a.html/> [retrieved on Oct. 26, 2009].

Roni Yagel and John Meeker, "Priority-driven Ray Tracing," The Journal of Visualization and Computer Animation, vol. 8, No. 1, pp. 17-32, Jan. 1, 1997.

Martin Christen, "Ray Tracing on GPU," Master's thesis, Univ. of Applied Sciences Basel (FHBB), Jan. 19, 2005 (Available online at http://gpurt.sourceforge.net/DA07_0405_Ray_Tracing_on_GPU-1.0.5.pdf, last visited Dec. 10, 2009).

| 1705 | 1710 | 1715 | 1720 | 1725 |
FIG. 17
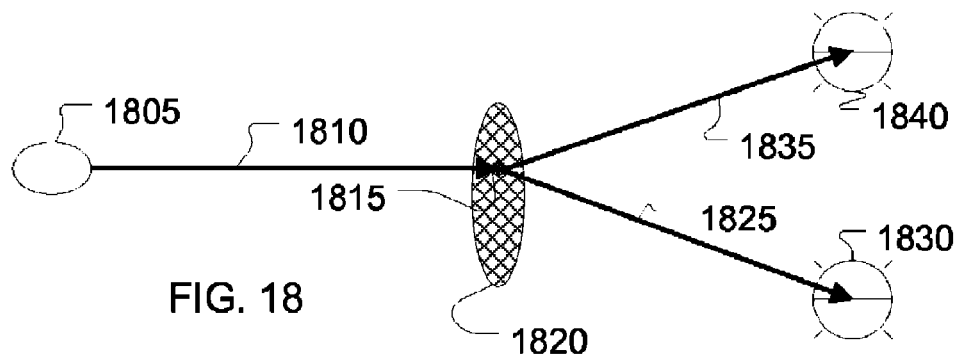
FIG. 18
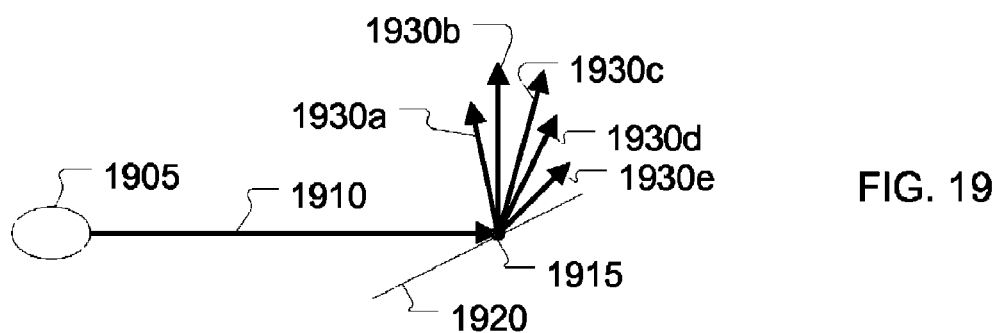
FIG. 19
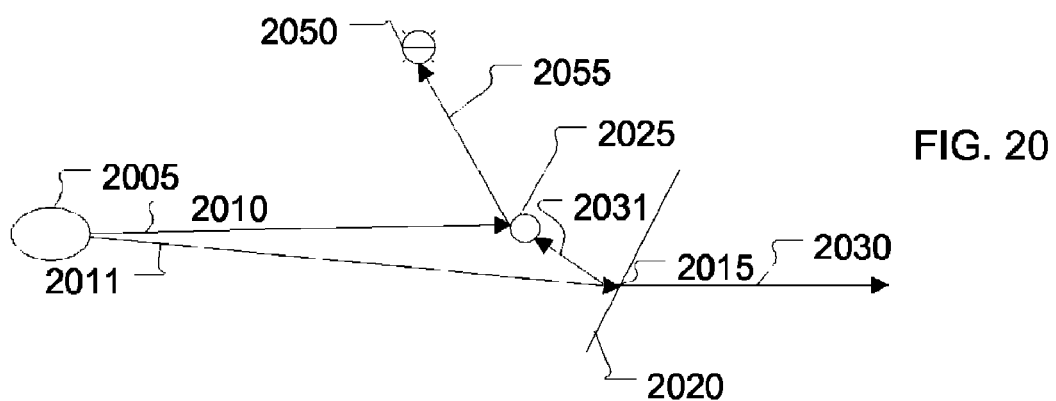
FIG. 20

TRACING OF SHADER-GENERATED RAY GROUPS USING COUPLED INTERSECTION TESTING

BACKGROUND

1. Field

The present invention generally relates to rendering two-dimension representations from three-dimensional scenes, and more particularly to using ray tracing for accelerated rendering of photo-realistic two-dimensional representations of scenes.

2. Description of Related Art

Rendering photo-realistic images with ray tracing is well-known in the computer graphics arts. Ray tracing is known to produce photo-realistic images, including realistic shadow and lighting effects, because ray tracing models the physical behavior of light interacting with elements of a scene. However, ray tracing is also known to be computationally intensive, and at present, even a state of the art graphics workstation requires a substantial amount of time to render a complicated scene using ray tracing.

Ray tracing usually involves obtaining a scene description composed of geometric primitives, such as triangles, that describe surfaces of structures in the scene, and modeling how light interacts with primitives in the scene by tracing light rays in the scene. A ray is a vector of virtual light with an origin and a direction in 3-space.

For example, a scene may comprise a car on a street with buildings on either side of the street. The car in such a scene may be defined by a large number of triangles (e.g., 1 million triangles) that approximate a continuous surface. A camera position from which the scene is viewed is defined. A ray cast from the camera is often termed a primary ray, while a ray cast from one object to another, for example, to enable reflection is often called a secondary ray. An image plane of a selected resolution (e.g., 1024×768 for an SVGA display) is disposed at a selected position between the camera and the scene.

A principal objective of ray tracing is to determine a color and intensity for each pixel of the image plane, such that this image can thereafter be displayed on a monitor, for example. In the physical world, viewing such a scene from the cameras perspective would result in light rays reaching the camera that owe their existence to one or more light sources, including diffuse and directed light sources. In the physical world, these light sources project light energy into the scene, and this light energy is transmitted, diffracted, reflected, and/or absorbed according to the types of materials that the light contacts, and the order in which they are contacted, during its journey from light source to the camera. This process is what ray tracing attempts to duplicate.

Although the physical world operates by light energy being traced from a source to the camera, because only a small portion of the light generated by a source arrives at the camera, it has been recognized that rays, for most circumstances, should be traced from the camera back to determine intersections with light sources, instead.

A simplistic ray tracing algorithm involves casting one or more rays from the camera through each pixel of the image into the scene. Each ray is then tested against each primitive composing the scene to identify a primitive which that ray intersects, then it is determined what effect that primitive has on the ray, for example reflecting and/or refracting it. Such reflection and/or refraction causes the ray to proceed in a different direction, and/or split into multiple secondary rays, which can take different paths. All of these secondary rays are then tested against the scene primitives to determine primitives they intersect, and the process recursively continues until the secondary (and tertiary, etc.) ray terminates by, for example, leaving the scene, or hitting a light source. While all of these ray/primitive intersections are being determined, a tree mapping them is created. After a ray terminates, the contribution of the light source is traced back through the tree to determine its effect on the pixel of the scene. As can be readily understood, the computational complexity of testing 1024×768 (for example) rays for intersection with millions of triangles is computationally expensive—and such ray numbers do not even account for all of the additional rays spawned as a result of material interaction with intersecting rays). Generally, ray tracing systems use a large majority of bandwidth in loading primitive information, as compared with data representative of rays.

It has been understood that tracing rays through a scene can require practically random access to an enormous amount of scene geometry. As can be appreciated, the typical computational paradigm provides for various memory tiers with an inverse relationship between latency and bandwidth and memory size. For example, most computing systems provide several tiers of caches that intermediate memory accesses to a main dynamic memory, which in turn intermediates access to non-volatile storage. Accessing the main dynamic memory can be an order of magnitude slower in bandwidth and latency than accessing an on-chip cache, and accessing non-volatile memory can be even slower in latency and bandwidth than accessing a main memory. For some applications, existing processor architectures can successfully hide a great deal of the latency differences by predicting when data presently in main memory or in non-volatile memory will be required. Such prediction has been found to be difficult in ray tracing, such that when using a tiered cache computer for ray tracing, the caches can thrash a great deal. On the other hand, providing enough fast memory to allow random access to all the primitives composing an entire complex scene is quite expensive and beyond the capabilities of most conventional systems. In the future, it is expected that scene resolution and complexity will continue to increase, and thus even though computers will become more powerful, with more memory, and higher memory bandwidths, the problem described above is expected to continue.

Some algorithmic approaches directed at this sort of problem have been proposed. One such approach is disclosed by Matt Pharr, et al. in "Rendering Complex Scenes with Memory-Coherent Ray Tracing" *Proceedings of SigGraph* (1997) ("Pharr" herein). Pharr discloses dividing a scene to be ray traced into geometry voxels, where each geometry voxel is a cube that encloses scene primitives (e.g., triangles). Pharr also discloses superimposing a scheduling grid, where each element of the scheduling grid is a scheduling voxel that can overlap some portion of the geometry voxels (i.e., the scheduling voxel is also a volumetric cube in the scene that can be sized differently than the cubes of the geometry voxels). Each scheduling voxel has an associated ray queue, which includes rays that are currently inside, i.e., these rays are enclosed within, that scheduling voxel, and information about what geometry voxels overlap that scheduling voxel.

Pharr discloses that when a scheduling voxel is processed, the rays in the associated queue are tested for intersection with the primitives in the geometry voxels that are enclosed by the scheduling voxel. If intersection between a ray and a primitive is found, then shading calculations are performed, which can result in spawned rays that are added to the ray queue. If there is no found intersection in that scheduling voxel, the ray is advanced to the next non-empty scheduling voxel and placed in that scheduling voxel's ray queue.

Pharr discloses that an advantage sought by this approach is to help scene geometry to fit within a cache that might normally be provided with a general purpose processor, such that if the scene geometry within each scheduling voxel can fit within a cache then that cache would not thrash much during intersection testing of rays with that scene geometry.

Also, Pharr discloses that by queuing the rays for testing in the scheduling voxel, that when the primitives are fetched into the geometry cache, more work can be performed on them. In situations where multiple scheduling voxels could be processed next, the scheduling algorithm can choose a scheduling voxel which would minimize the amount of geometry that needs to be loaded into the geometry cache.

Pharr recognizes that the proposed regular scheduling grid may not perform well if a particular scene has non-uniform complexity, i.e., a higher density of primitives in some portions of the scene. Pharr hypothesizes that an adaptive data structure, such as an octree could be used in place of the regular scheduling grid. An octree introduces a spatial subdivision in the three-dimensional scene by causing, at each level of the hierarchy, a subdivision along each principal axis (i.e., the x, y, and z axis) of the scene, such that an octree subdivision results in 8 smaller sub-volumes, which can each be divided into 8 smaller sub-volumes, etc. At each sub-volume, a divide/do not divide flag is set which determines whether that sub-volume will be further divided or not. Such sub-volumes are indicated for sub-division until a number of primitives in that sub-volume is low enough for testing. Thus, for an octree, an amount of subdivision can be controlled according to how many primitives are in a particular portion of the scene. As such, the octree allows varying degrees of volumetric subdivision of a volume to be rendered.

A similar approach is disclosed in U.S. Pat. No. 6,556,200 to Pfister ("Pfister"). Pfister also discloses partitioning a scene into a plurality of scheduling blocks. A ray queue is provided for each block, and the rays in each queue are ordered spatially and temporally using a dependency graph. The rays are traced through each of the scheduling blocks according to the order defined in the dependency graph. Pfister references the Pharr paper and adds that Pfister desires to render more than one single type of graphical primitive (e.g., not just a triangle), and to devise more complicated scheduling algorithms for the scheduling blocks. Pfister also contemplates staging sub-portions of scene geometry at multiple caching levels in memory hierarchy.

Yet another approach has been referred to as packet tracing, and a common reference for such packet tracing is "Interactive Rendering through Coherent Ray Tracing" by Ingo Wald, Phillip Slusallek, Carsten Benthin, et al., *Proceedings of EUROGRAPHICS* 2001, pp 153-164, 20(3), Manchester, United Kingdom (September 2001). Packet tracing involves tracing a group of coherent rays through a grid. The rays emit from a substantially common grid location and travel in a substantially similar direction, such that most of the rays go through common grid locations. Thus, packet tracing requires identifying rays traveling in a similar direction, from a similar origin. Another variation is to use frustrum rays to bound edges of the packet of rays, such that the frustrum rays are used to determine which voxels are intersected, which helps reduce a number of computations for a given ray packet (i.e., not all rays are tested for intersection, but only those on the outer edges of the packet). Packet tracing still requires identification of rays that originate from a similar place and go in a similar direction. Such rays can be increasingly difficult to identify as rays are reflected, refracted and/or generated during ray tracing.

SUMMARY

The following system, and method aspects relate to accelerating rendering of scenes using ray tracing, the systems and methods include ways to accelerate intersection testing, more efficiently represent quantities of rays for transmission and storage, as well as aspects of adapting ray tracing to meet rendering goals, as well as subsets of these aspects. The rays may be provided from a host computer for a driver and other processes, while intersection testing may be accomplished in a dedicated resource. Indicia of intersections between rays and primitives may be provided to the host for shading and/or other processing in order to ultimately display a rendered image of the scene.

Examples of particular aspects include a ray tracing system for rendering a 2-D representation of a 3-D scene composed of primitives. The system comprises a computing resource configured for maintaining a sample buffer of accumulated data for a plurality of samples of a 2-D representation for a 3-D scene composed of primitives. The computing resource is further configured for outputting groups of rays for intersection testing, wherein the rays of at least some of the groups are specified by a shared attribute and individual ray data, wherein each ray of the group is associated with a respective weight, and for processing identified intersections between rays and primitives, the processing resulting in the outputting of at least some of the groups of rays, wherein a number of rays in at least some of these groups is determined at least in part by respective weights of rays identified as intersecting. The system also comprises an intersection testing resource configured to receive the shared attributes and the individual ray data, and produce a respective origin and a respective direction for each ray, and test the rays of the group for intersection with primitives composing the 3-D scene. The intersection testing resource also is configured to provide, to the computing resource, indications of any identified ray/primitive intersections.

Other aspects may include a method for rendering a 2-D representation of a 3-D scene composed of primitives. The method comprises accessing primitive information and surface information for a 3-D scene to be rendered, and determining a group of camera rays for intersection testing in the scene. Each camera ray is associated with a respective weight, and is represented by data shared among the group, and individual data for that ray. The method also comprises determining a group of shader rays for intersection testing in the scene, where each shader ray may be associated with a respective weight and is represented by data shared among the group as well as individual data for that ray. The method also comprises providing the group of camera rays and the group of shader rays to an intersection testing resource through an input. In the intersection testing resource, the method comprises determining an origin and direction for each ray of each group based on respective shared data and individual data, intersection testing the rays in the scene, and outputting indications of detected intersections between any ray and a primitive composing the scene. Such indications include information for identifying the ray and the primitive involved in the intersection. In the method, the determining of the group of shader rays may be performed responsively to indications of detected intersections, and a number of shader rays in the group may be determined at least in part by the weight associated with the ray identified in the indication.

Still further aspects include a method for rendering a 2-D representation of a 3-D scene composed of primitives, wherein the method comprises defining groups of rays to be tested for intersection with primitives composing a 3-D scene, and accepting the groups of rays in an intersection testing resource configured for parallelized testing of rays for intersection with elements of geometry acceleration data (GAD) and the primitives. The testing of the rays of each group for intersection with GAD elements to disperse the rays of each group into a plurality of collections, while each collection is associated with an element of the GAD bounding a selection of the primitives. The method also comprises tracking readiness of the collections of rays for further intersection testing, and scheduling testing for collections ready for further intersection testing. Each group of rays comprises one of camera rays and shader rays, while ray collections may comprise one or more of camera rays and shader rays.

On an as available basis, the method may also comprise scheduling further groups of rays for intersection testing, where the testing causes dispersal of tested rays into collections associated with elements of GAD that bound increasingly smaller selections of the primitives. As primitives are identified that are bounded by a given element of GAD without an intervening GAD element, the testing of those primitives for intersection with rays of the collection associated with the given GAD element can be accomplished, resulting also in outputting indications of any identified intersection.

The method also comprises shading intersections identified by outputted indications, thereby causing generation of shader rays for further intersection testing.

Still further aspects include a method for use in rendering a 2-D representation of a 3-D scene composed of primitives, where the method comprises determining a plurality of rays requiring intersection testing with primitives composing a 3-D scene, and the plurality of rays include camera rays and rays generated during shading of identified intersections between rays and primitives. The method also comprises identifying a subset of the rays to test for intersection with a subset of the primitives, the subset of the rays identified based on determining that each ray of the subset intersects a geometric shape bounding the subset of the primitives. The method also comprises outputting indications of intersections identified, each of the indications including information for identifying one of the rays and a primitive which that ray intersects; and shading the identified intersections. The shading generating rays for further intersection testing; a respective number of rays generated for each of the identified intersections is based at least in part on an indication of importance of the ray identified by the intersection indication to a 2-D representation of the 3-D scene being rendered.

Any such methods may also include adapting the ray tracing based on metrics related to rendering progress as well as indicia of importance of rays being shaded to the scene rendering.

Still further aspects comprise a system for rendering a 2-D representation of a 3-D scene composed of primitives. The system comprises a computing resource configured for defining camera rays to be tested for intersection with primitives composing a 3-D scene, and for executing shading processes for identified intersections. The shading processes cause generation of shader rays also to be tested for intersection, The computer resource is also configured for outputting the camera rays and the shader rays, and for tracking status of rays outputted. The system also comprises an intersection testing resource configured for testing rays, on a collection-by-collection basis, for intersection with one or more of elements of geometry acceleration data (GAD) and the primitives. The intersection testing resource also is configured for accepting the outputted rays, and managing a memory resource storing the accepted rays. The intersection testing resource is also configured for maintaining a list of collections of rays available to be intersection tested in the intersection testing resource, wherein collections of rays are associated with respective elements of GAD. Rays are added to a given collection in response to determining that such rays intersect the GAD element associated with that collection. The intersection testing resource also is configured for tracking readiness of the listed collections for further intersection testing, scheduling testing for collections ready for further intersection testing, and for commencing testing of rays of a scheduled collection. The selecting of the elements of GAD or the primitives against which such rays are to be tested is based on identifying elements of GAD interrelated to the element of GAD associated with the scheduled collection.

Any such systems can also provide the intersection testing resource with access to a memory resource of sufficient size to store at least 10000 rays in flight. The intersection testing resource also can be configured for receiving information defining the primitives from a main storage without their storage in an intermediating cache.

Such systems also may provide that each ray may be tested against the primitives in an order different than an order that the ray would naturally traverse the scene, and the intersection testing resource is further configured for maintaining information concerning a current closest detected intersection.

BRIEF DESCRIPTION OF THE DRAWINGS

For a fuller understanding of aspects and examples disclosed herein, reference is made to the accompanying drawings in the following description.

FIG. 17 illustrates a data structure for rays according to some aspects herein;

FIGS. 18-20 are used in describing aspects of ray shading and ray emission adaptivity that can be used in systems described herein;

DETAILED DESCRIPTION

The following description is presented to enable a person of ordinary skill in the art to make and use various aspects of the inventions. Descriptions of specific techniques, implementations and applications are provided only as examples. Various modifications to the examples described herein may be apparent to those skilled in the art, and the general principles defined herein may be applied to other examples and applications without departing from the scope of the invention.

Figure 1:
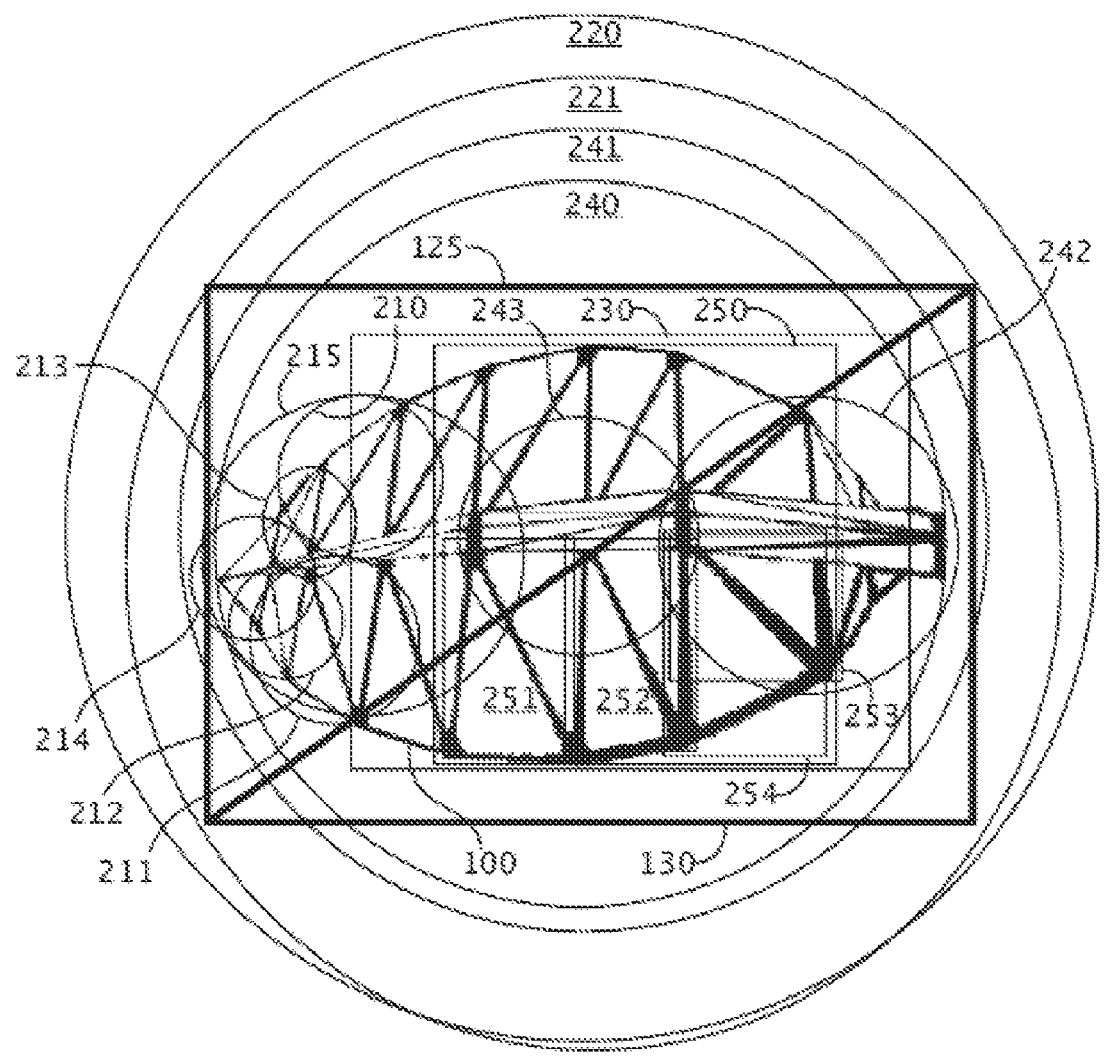
FIG. 1 illustrates a simplistic example of a scene to render.
Figure 2:
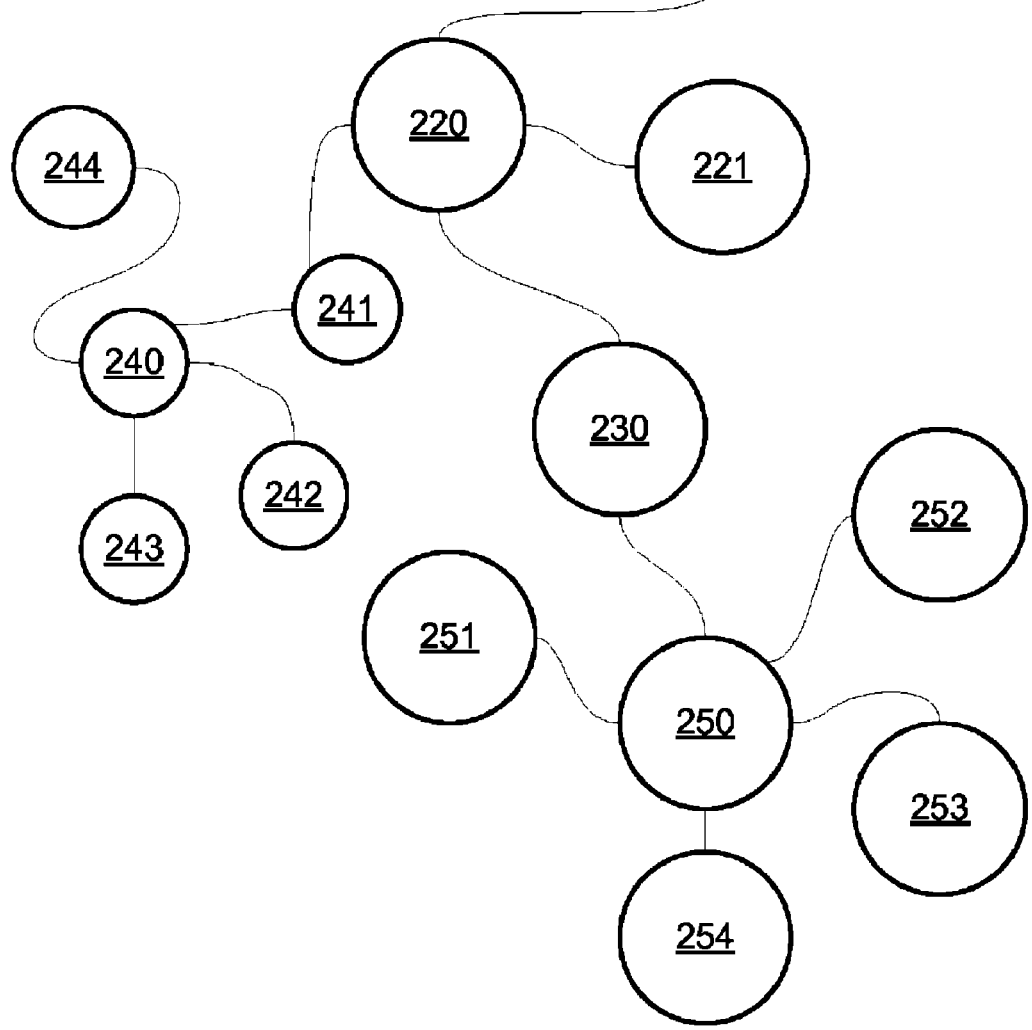
FIG. 2 introduces a simplified example of a graph of geometry acceleration data used to abstract the scene of FIG. 1.

This description proceeds by introducing aspects relating to an example of a three-dimensional (3-D) scene (FIG. 1), that can be abstracted with geometry acceleration data, as in the example of FIG. 2. Such a 3-D scene can be rendered as a two-dimensional representation with systems and methods according to the examples illustrated and described. The systems comprise an intersection testing resource for accelerating identification of intersections between rays and primitives, and a host computing resource for processes that interface with applications needing rendering services and with the intersection testing resource, and also include processes for shading intersections identified by the intersection testing resource.

The shading of such intersections can result in creation of more rays for intersection testing, and other system and method aspects include ways to adaptively formulate such rays to achieve goals or other criteria while minimizing degradation of rendering quality. As many rays are traced in parallel, and the throughput of the intersection testing resource is high, the systems and methods also include provisions for increasing the efficiency of describing many types of rays to be tested for intersection, such that bandwidth to transmit the rays to the intersection testing resource is reduced.

The following paragraphs provide an overview of concepts useful in understanding system and method aspects described later.

As introduced in the background, rendering a 3-D scene involves creating a 2-D representation of it for display. Such conversion requires selecting a camera position, from which the scene is viewed. The camera position frequently represents a location of a viewer of the scene (e.g., a gamer, a person watching an animated film, etc.) The 2-D representation is usually at a plane location between the camera and the scene, such that the 2-D representation comprises an array of pixels at a desired resolution. A color for each pixel is determined through rendering. During ray tracing, rays can be initially cast from the camera position to intersect the plane of the 2-D representation at desired points, and which then continue into the 3-D scene. Herein, a location at which a ray intersects the 2-D representation is retained, e.g., stored in a data structure associated with that ray.

A camera position (i.e., a point for initial emission of rays to be intersection tested) is not necessarily a single point defined in space, and instead a camera position can be diffuse, such that rays can be cast from a number of points considered within the camera position. Each ray intersects the 2-D representation within a pixel, which can also be called a sample. In some implementations, a more precise location of where a ray intersected a pixel can be recorded, which may allow more precise interpolation and blending of colors among neighboring pixels.

Representing contours of realistic and finely detailed objects in the 3-D scene is usually done by providing a large number of small geometric primitives (e.g., triangles) that approximate a surface of the object (e.g., a wire frame model). As such, a more intricate object may need to be represented with more primitives and smaller primitives than a simpler object. Although providing a benefit of higher resolution, performing intersection tests between rays and larger numbers of primitives is computationally intensive, especially since a complex scene may have many objects. Therefore, geometry acceleration data (hereinafter referred to as GAD) can be used to approximate boundaries for one or more primitives (or abstracting) in a scene to accelerate such testing. Examples of GAD are described further below.

For clarity in description, data for a certain type of object, e.g., coordinates for three vertices of a triangle primitive, is described simply as the object itself, rather than referring to the data for the object. For example, when referring to "fetching a primitive", it is to be understood that data representative of that primitive is being fetched.

Geometry Acceleration Data

Geometry Acceleration Data (GAD) was introduced above as a means for approximating (abstracting) boundaries of other objects or primitives to accelerate intersection testing. GAD may include elements that each bound a collection of the primitives in the scene. Bounding may include providing a geometric shape that encloses, in 3-D space, a respective collection of primitives, such that failure to intersect a surface of the geometric shape with a ray indicates that the ray also does not intersect any primitive bounded by the shape. Since GAD primarily is useful in abstracting primitives for more quickly identifying intersections between rays and primitives, GAD elements preferably are shapes that can be easily tested for intersection with a ray. For example, testing a sphere for intersection with a ray usually requires less computation than testing a 3-D box in a KD tree. Other considerations for GAD shapes can include the shape of a primitive whose boundary is being approximated, and whether a GAD shape should be rotated to better fit a primitive or a collection of primitives, or whether the shape should be irrotational within a scene. Examples of constructs that can be used as GAD include spheres, squares, rectangles, groups of splines, and so on.

GAD may include a number of distinct elements that can be interrelated to each other. For example, elements of GAD can be a plurality of spheres, where each sphere bounds a portion of geometry describing an aspect or portion of a scene to be rendered. GAD elements (e.g., spheres) of the plurality can be interrelated with each other in a graph.

In a graph of elements of GAD, the elements may be identified as graph nodes, and pairs of the elements may be connected by edges. Where a pair of elements is connected by an edge, the edge may indicate that one of the nodes has a different relative granularity than the other node, which can mean that one of the nodes connected by that edge bounds more or fewer primitives than the other node. Thus, in such an arrangement of GAD, by traversing the graph along its edges during intersection testing, rays being tested for intersection can be tested against GAD elements bounding varying amounts and/or arrangements of primitives.

As introduced above, a sphere is one type of shape that can be used as a GAD element. Using spheres as GAD elements may enhance portability/interchangeability of portions of a GAD graph. A graph of spherical GAD need not conform to an explicit goal of remaining balanced, spatially, or otherwise, as often is the case in a KD tree. For example, entire portions of such a graph can be moved at will. Such portability may allow for the optimization of a GAD graph that will remain in a rendering system for more than one frame. It will also allow an artist to provide hints to the system as to which primitives and other pieces of geometry comprise building blocks for the larger scene, or may be intersected by a disproportionately large portion of the rays in the scene.

In some aspects, the elements of the GAD can be arranged hierarchically in the graph such that the graph of GAD includes one or more root nodes that collectively bound the primitives describing the scene, and where each root node bounds a subset of those primitives. The root node(s) of a graph of GAD also may be implied simply because a scene generally has only a given extent (i.e., the scene is finite), and the root node may be defined to include the entire scene. For example, a scene may be defined within a bounding box or sphere, and the root node may impliedly be functionally co-extensive to that bounding box or sphere.

Each root node may have one or more child nodes that each bound a subset of the primitives bounded by a respective root node. In turn, these child nodes can serve as parent elements for one or more child elements that bound subsets of primitives bounded by its respective parent node. The subsets of primitives bounded by child nodes of a particular parent node may be disjoint, such that primitives bounded by one of the child nodes are not also bounded by another of the child nodes. Various child nodes may have non-zero unions between their respective sets of bounded primitives, while also not having a subset relationship either.

Further subdivision of the primitives bounded by a particular element of GAD may be made until the number of primitives bounded within such GAD element is deemed small enough to not require further subdivision. Such subdivision of primitives among elements of GAD can serve to provide a framework for referencing groups of primitives with a desired degree of granularity. For example, the leaf illustrated in FIG. 1 can be abstracted first with a sphere (i.e., an element of GAD) that bounds the entire leaf, and then smaller portions of the leaf can be abstracted with smaller spheres or other shapes. For example, the vein may be abstracted with a one or more spheres. A sphere bounding (abstracting) the entire leaf need not also bound the entirely of a sphere bounding only a part of the leaf, and frequently may not do so. In other words, a primitive in a scene may be bounded by multiple GAD elements, but each GAD element bounding that primitive need not also be bounded by other GAD elements that also bound that primitive.

In the exemplary aspects herein, sufficiency of subdivision can be based on characteristics of a hardware unit or other resources intended to perform the intersection testing. For example, if an intersection testing unit (examples of such provided below) included 32 testing units, then subdivision may continue until no more than 32 primitives were bounded by a particular element of GAD to allow testing of all the primitives bounded by one element of GAD to be done in parallel, as described in more detail below.

Although the above example primarily focuses on an example of spherical bounding elements arranged in a graph, other types of geometry acceleration structures including KD trees, octrees, BSP trees, and voxel grids can be arranged as graphs of nodes. For example, nodes of the graph, if based on a kd tree, would include nodes of the kd-tree. Edges of the graph would include the conceptual further subdivision of a given space, in other words, a given node would have up to 8 edges connecting the given node to up to 8 other nodes, each being a cube found within a boundary of the given node. Similar situations apply to the other example geometry acceleration structures cited.

In summary of some exemplary aspects of GAD herein, GAD may comprise a graph of nodes, where nodes may be connected by respective edges to other nodes.

In some aspects, each node is connected to only one other node. In some aspects, an edge connecting a first node to a second node indicates a direction of granularity between the first and second node. For example, higher granularity can indicate which of the first or the second node connected by an edge bounds fewer GAD elements or individual pieces of geometry, or a combination thereof. In a converse example, lower granularity can indicate that one of the nodes bounds all of the primitives also bounded by the higher granularity node, in addition to primitives bounded by a different node, which can be connected to the lower granularity node by another edge.

This direction of granularity may be defined explicitly or implicitly in the graph, meaning that where explicitly defined, an intentionally directed search may be conducted, generally in a direction from larger GAD elements towards smaller elements such that increasingly smaller amounts of primitives to test for intersection can be identified. Where a direction is implicit, a directed search may happen coincidentally, or information defining a bounding volume can be used to extract a direction in the graph. For example, a test could be conducted to determine relative sizes of the GAD elements, and a smaller of the elements could be selected.

Broadly viewed, elements of GAD may heterogeneously bound both other elements of GAD as well as primitives that are not also bounded by another GAD element bounded at least in part by any smaller GAD element. For example, a larger sphere may bound the entire leaf illustrated in FIG. 1, while respective smaller spheres each may bound the primitives that define a tip of the leaf, but a portion of the leaf may be defined by primitives that are not bounded by any sphere smaller than the sphere which bounds the entire leaf. Conversely, a GAD arrangement may be defined such that any one element of GAD bounds only primitives or other GAD elements, such that primitives would not be tested for intersection until leaf nodes of such an arrangement are reached.

In further explanation of some particular examples, hierarchically arranged GAD can be used to represent the geometry of the three-dimensional scene. Root node(s) of the hierarchically arranged GAD can represent the entire three-dimensional scene. Intermediate nodes of the hierarchically arranged geometry acceleration data can represent differently sized, or differently grouped, sub-portions of geometry of the three-dimensional scene. Leaf nodes of the hierarchically arranged geometry acceleration data can bound geometric primitives of the three-dimensional scene. Also any graph of GAD can include, as nodes of the graph, complete sub-graphs of nodes that can be traversed. And in the particular example of hierarchical graphs, each node can include a hierarchical sub-graph.

When generating an intra-primitive hierarchy, a simple state machine can yield sufficient results (approaching those as good as a highly optimized hierarchy). This is because most objects bear some resemblance to spheres, and objects in a scene are often large relative to spaces between objects. The generation of geometric primitive data and geometry acceleration data can occur asynchronously, such that a software driver can receive a scene description and produce from it both geometric primitive data and geometry acceleration data.

In explanation of a more concrete example, FIG. 1 illustrates a top view of leaf 100 with nodes of geometry acceleration data bounding selections of primitives composing the leaf, the nodes of GAD are displayed in an example graph 200 arrangement in FIG. 2. Leaf 100 is illustrated as being on a background composed of two large triangles, triangle 130 and triangle 125. Each circle and box represents a 3-D sphere and box respectively. The boxes can be rectangular or cubic, or even some other shape, like a parallelepiped, if it were so desired in an implementation.

As depicted, the elements of GAD can include shapes other than spheres, e.g., rectangles 251, 252, 253, and 254. Other aspects of such bounding is that sphere 220 functions as a root node, bounding the entire leaf. Sphere 221 bounds the large triangles 130 and 125 composing a background for leaf 100, as well as leaf 100. Sphere 220 bounds both sphere 221 and sphere 241, which in turn bounds sphere 240. Both sphere 240 and sphere 241 bound primitives composing leaf 100. The arrangement of sphere 220, 221, 240 and 241 illustrates that one sphere need not bound multiple "child" spheres. Also, the arrangement of 220 and 221 (see FIG. 2) shows that even though two spheres bound the same geometry, they need not also have connectivity to nodes bounding subsets of primitives in the scene.

Sphere 215 bounds the tip quarter of leaf 100. Sphere 215 is not entirely bounded by sphere 240, even though sphere 240 bounds the primitives bounded by sphere 215. Referencing sphere 215 in FIG. 2, it is illustrated that nodes 210-214 are children of sphere 215, but the full extent of each sphere 210-214 need not be bounded by sphere 215, as the consideration of interest is that the primitives are bounded. Spheres 242 and 243 bound portions of a center vein of leaf 100. Box 230 bounds a selection of the primitives of leaf 100, and also includes children nodes 250-254 as illustrated in the graph 200. Box 250 bounds both primitives directly and child notes. Boxes 251 and 252 bound primitives directly, while boxes 253 and 254 each bound one primitive. The use of both boxes and spheres indicates that different shapes for GAD can be used simultaneously. Also, GAD elements may bound one or more than one primitive.

FIG. 2 illustrates a graph 200 of elements of GAD that can be used to abstract the scene of FIG. 1. In particular, because scene primitives are quite small compared to a size of an average scene to be rendered (even though FIG. 1 illustrates a small scene), it would be understood that an actual graph of GAD usually would be much larger than graph 200. Graph 200 includes only nodes that each represents an element of GAD that bounds a portion of primitives composing the scene. As can be understood, this example is of a largely hierarchical arrangement of elements of GAD in a graph. By illustration, if a ray is tested for intersection with the element of GAD at node 230, and it does not intersect node 230, testing need not be done for GAD elements 240-244, or for primitives within those elements. Where a primitive is bounded by multiple GAD elements, incidentally or otherwise, there is at least a partial overlap in space between these elements, and a primitive within that overlap may have intersection testing skipped, and then have it performed later during processing of another GAD element.

Intersection Testing

Figure 3:
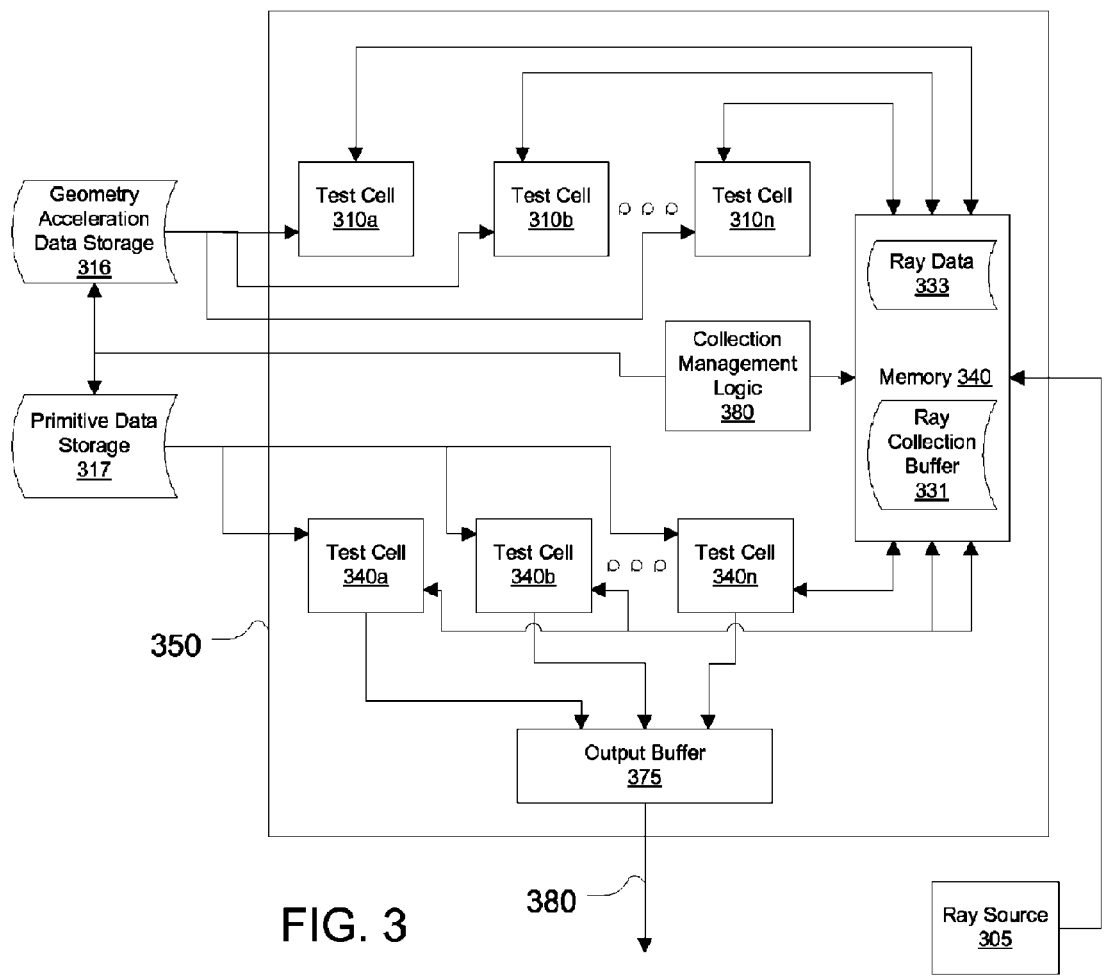
FIG. 3 illustrates aspects of an intersection testing unit that may provide intersection testing functionality in a rendering system.

FIG. 3 includes a block diagram of an example intersection testing unit (hereinafter, "ITU") 350, which is an example of an intersection testing resource, and which can be used in a rendering system for ray tracing two dimensional representations of a three dimensional scene. The ITU 350 can be viewed as a function or a utility that can be called through a control process or driver that provides ITU 350 with rays and elements of a scene against which the rays would be tested for intersection. Examples of such processes and drivers are described with respect to later figures.

For accelerating the ray tracing, the ITU 350 is also provided with GAD that bounds portions of the scene, and which the ITU can use for accelerating intersection testing of the rays. The GAD would be provided in a format useful by the ITU 350, and may be the subject of a handshake procedure, or parameter selection, pre-arranged organization, and the like.

ITU 350 returns indications of identified intersections, which typically includes that the ITU 350 provides information sufficient to identify a ray and a primitive which the ray was determined, within a given degree of precision, to intersect.

For example, ITU 350 can be fed information through a driver that interfaces ITU 350 with other rendering processes, such as shading, and initial ray generation functions. From the perspective of ITU 350, ITU 350 need not be "aware" of the origin of the information provided to it, as ITU 350 can perform intersection testing using the rays, GAD, and primitives (or more generally, scene geometry) provided to it, or obtained by it based on other information provided to it. Thus, the system as a whole can render a 2-D representation of a scene, with ITU 350 providing intersection testing functionality to the system.

ITU 350 may control how, when, and what data is provided to it, such that ITU 350 is not passive, and may for example, fetch ray or geometry data, or acceleration data as required for intersection testing. For example, ITU 350 may be provided with a large number of rays for intersection testing, along with information sufficient to identify a scene in which the rays are to be tested. ITU 350 may thereafter control temporary storage of the rays during processing and may also initiate fetching of primitives and elements of GAD as needed during the processing. In some examples, ITU 350 may be provided more than ten thousand rays (10,000) rays for intersection testing at a given time. For example, ITU 350 may be provided with more than 10,000 rays at an initial startup, and as testing for rays complete, new rays may be provided to keep the number of rays being processed in the ITU 350 at about the initial number.

Also, ITU 350 can operate asynchronously with respect to units that provide input data to it, or receive outputs from it. Here, "asynchronous" can include that the ITU may receive and begin intersection testing of additional rays while intersection testing continues for previously received rays. Also, "asynchronous" may include that rays do not need to complete intersection testing in an order that ITU 350 received them. Asynchronous also includes that intersection testing resources in ITU 350 are available for assignment or scheduling of intersection testing without regard to position of a ray within a 3-D scene, or a scheduling grid superimposed on the scene, or to test only rays having an intergenerational relationship, such as parent rays and children rays spawned from a small number of parent rays, or only rays of a specific generation—e.g., camera rays or secondary rays.

Regarding the particulars of this example ITU 350, ITU 350 includes a memory 340, which receives rays from a source of rays 305, which can be a driver running on a host processor, or shading code or a shading processor, or a combination thereof, for example. Memory 340 includes logical and/or physical partitions for storing ray data, identified as ray data 333, and a ray collection buffer 331, both of which are further described herein, along with their usage and functionality.

ITU 350 includes a plurality of test cells 310a-310n and test cells 340a-340n. Test cells 310a-310n, in the present example, are for testing elements of GAD provided from a GAD data storage 316, while test cells 340a-340n are for testing primitives provided from a primitive data storage 317.

Logically, GAD data storage 316 and primitive data storage 317 are separately identified, but they may be the same physical memory resource, or may be partially shared and partially distinct.

ITU 350 also includes an output buffer 375 which receives indications of identified intersections of primitives and rays which intersected the primitive. In an example, the indications include an identification for a primitive paired with an information sufficient to identify a ray that intersected the primitive. Identification information for a ray may include a reference, such as an index, which identifies a particular ray in a list of rays maintained in resources available to a host processor. For example, the list may be maintained by a driver running on a host processor. The ray identification information may also include information, such as the ray's origin and direction, sufficient to reconstruct the ray. It is usually the case that fewer bits would be required to pass references, which can be an advantage.

ITU 350 also includes collection management logic 380, which, as will be described further herein, tracks status for ray collections stored in memory 340, and determines which collections are ready for processing. Collection management logic 380 is illustrated in FIG. 3 as connecting to memory 340, and which initiates delivery of rays for testing to each of the connected test cells. Where ITU 350 operates with GAD elements that bound either other GAD elements or primitives, rather than some combination thereof, collection management logic 380, depending on whether a particular collection is associated with a GAD element that bounds primitives or other GAD elements, assigns rays either to test cells 340a-340n or test cells 310a-310n, respectively.

In examples where a particular GAD element may bound both other GAD elements and primitives, ITU 350 would have datapath for providing both GAD elements and primitives to each test cell, as well as rays, and collection management logic 380 would arrange for testing rays of collections among the testing resources. In such examples, because of the typical difference in shape between GAD elements and primitives (spheres versus triangles, for example), an indication to switch test logic or load an intersection test algorithm optimized for the shape being tested may be provided from collection management logic 380.

Collection management logic 380 also or in substitution may interface with test cells 310a-310n and test cells 340a-340n. In such variations, collection management logic 380 provides information to each test cell so that each test cell may initiate fetching of ray data for test from memory 340. Although test logic 380 is illustrated separate from memory 340, test logic 380 in implementations may be inter-related and implemented within circuitry of memory 340, as management functionality performed by test logic 380 largely relates to data stored in memory 340.

An ability to increase parallization of access to memory 340 by intersection test resources is an advantage of inventive aspects described herein. As such, increasing a number of access ports to memory 340, preferably up to at least one per test cell is advantageous. An example of such an organization and advantages of it are further described with respect to FIG. 5. Examples of operation of ITU 350 are provided with respect to methods 600 and 700 of FIGS. 6 and 7.

Figure 4:
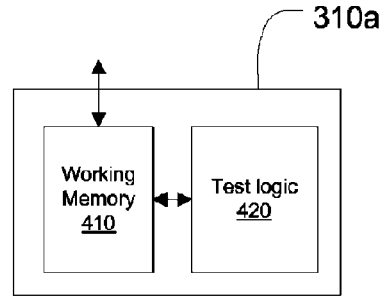
FIG. 4 illustrates aspects of an example test cell for use in the ITU.

FIG. 4 illustrates an example of a test cell 310a, which may contain a working memory 410 and test logic 420. Working memory 410 may be several registers, which contain information sufficient to test a line segment for intersection with a surface, or may be more complicated in other implementations. For example, working memory 410 may store instructions for configuring test logic 420 to test a particular shape received for intersection and may detect what shape was received based on the data received. For example, a sphere can be specified by a point and a radius about the point; that a sphere has been used as GAD in view of this data can be inferred. Test logic 420 performs the intersection test at an available or selectable resolution, and can return a binary value indicating whether or not there was an intersection detected. The binary value can be stored in the working memory for reading out, or can be outputted for latching during a read cycle in memory 340.

Figure 5:
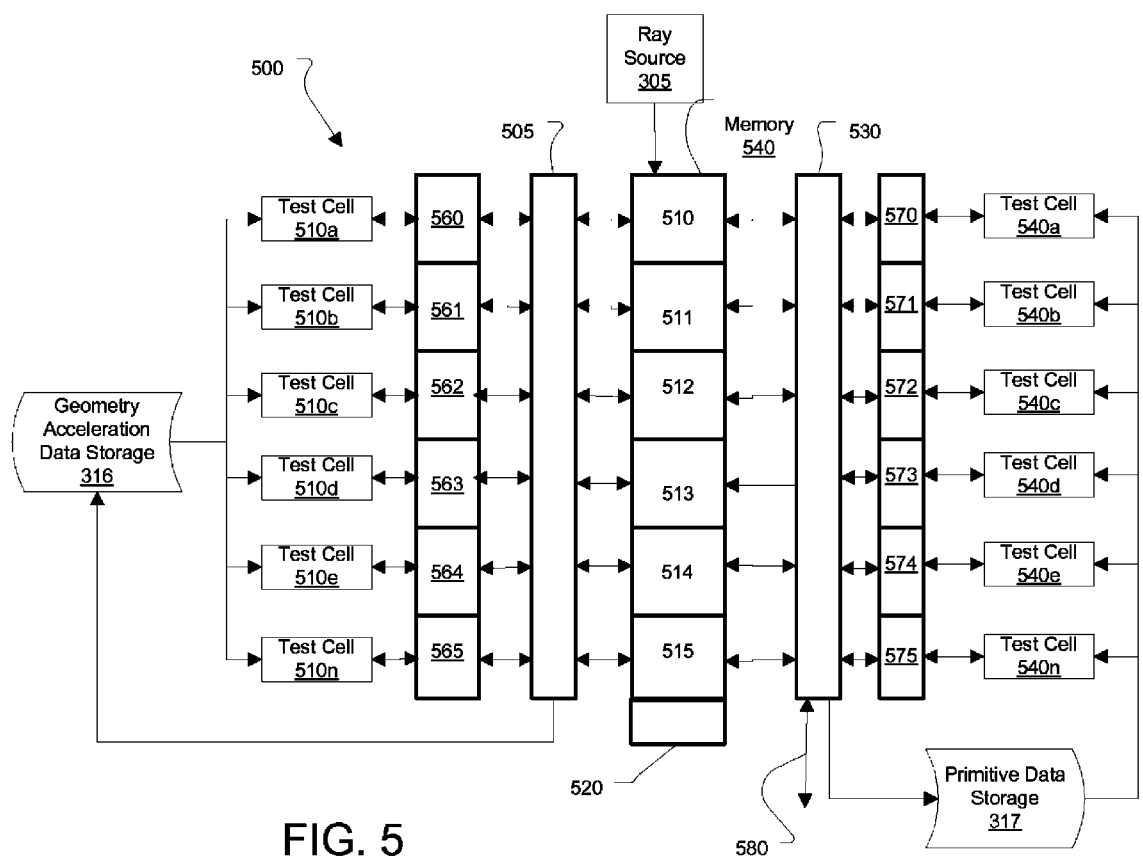
FIG. 5 illustrates further aspects of an intersection testing unit.

FIG. 5 illustrates aspects of an implementation of an intersection testing unit 500, focusing in more detail on an example memory organization. In ITU 500, test cells 310a-310n and 340a-340n again appear. This does not imply any requirement as to number of test cells. In this example, test cells 310a-310n are for intersection testing of GAD elements and test cells 340a-340n are for intersection testing of primitives. Thus, in ITU 500, both primitives and GAD elements may be tested in parallel. If it were determined, however, that more test cells of one variety or another would be required, then any test cell could be reconfigured as appropriate. As transistor density continues to increase, more such test cells can be accommodated. As will be described, portions of the test cells can be treated as a operational group, in that they will test rays against a common shape (i.e., a primitive or GAD element). Test cells 340a-340n can return binary values indicating an intersection with a primitive at a specified precision level (e.g., 16 bits), and can also return a more precise indication of where on the primitive the ray intersected, which can be useful for larger primitives.

In ITU 500, memory 540 comprises a plurality of independently operation banks 510-515, each of which has two ports. One port is accessed through GAD test logic 505, while the other is accessed through primitive test logic 530. Each of GAD and primitive test logic 505 and 530 operate to manage a flow of data between respective working buffers 560-565 and 570-575, and respectively to obtain GAD elements for test from GAD storage 316 and from primitive storage 317. The banks 510-515 are intended to operate, for the most part, to provide non-conflicting access to ray data by GAD and primitive test logic 505 and 530, such that each test cell 310a-310n and test cell 340a-340n can be provided a ray from separate banks of 510-515. A conflict can arise where two rays to be tested reside in the same bank, and in such cases, the accesses can be handled sequentially by the test logics 505 and 530. In some cases, working buffers 560-565 and 570-575 can be loaded for the next processing while other processing is completed.

By testing rays in consistent arrangements, tracking of which ray is assigned to which test cell can be reduced. For example, each collection can have 32 rays, and there may be 32 of test cells 310a-310n. For example, by consistently providing the $4^{th}$ ray in a collection to test cell 310d, test cell 310d need not maintain information about what ray was provided to it, but need only return an indication of intersection.

Storage for ray collection data can be implemented as ray collection buffer 331 and ray collection buffer 520, for each ITU 350 and 500 respectively. The Ray collection storage may be implemented as an n-way interleaved cache for ray collections, such that any given ray collection may be stored in one of n portions of ray collection buffer 331 or 520. Ray collection buffer 331 or 520 may then maintain a list of the ray collections stored in each of the n portions of the buffer. An implementation of ray collection buffer 331 or 520 may include using an identifying characteristic of an element of GAD associated with a ray collection, for example, an alphanumeric character string that may be unique among the elements of GAD used in rendering the scene. The alphanumeric character string may be a number. The string may be hashed to obtain a reference value to one of the n portions of ray collection buffer 331 and 520. In other implementations, elements of GAD may be predestined for storage in a given portion of ray collection buffer 331 and 520 by for example mapping segments of the alphanumeric strings in use to portion(s) of such buffer. Primitive/Ray intersection output 580 represents an output for identifying potential primitive/ray intersections, output 580 can be serial or parallel. For example, where 32 primitive test cells 540a-540n exist, output 580 can include 32 bits indicating presence or absence of an intersection for each ray against the primitive just tested. Of course outputs could come directly from the test cells in other implementations.

Operational aspects of ITU 350 and 500 are described further with respect to FIGS. 6 and 7, below. An overview of the following example methods of testing rays for intersection in a scene composed of primitives includes ITU operation of traversing a graph of GAD elements, each bounding selections of the primitives. During such traversal, collections of rays are tested for intersection with the GAD elements. A collection of rays can be formed by testing rays for intersection with a given GAD element, and then for those rays that intersect that element, a collection may be formed. Rays may continue to be tested for intersection with that given GAD element until its collection has a sufficient number of rays. Then, the rays of that collection may be tested for intersection with nodes of GAD elements connected to that GAD element. These aspects will be described in more detail below, with respect to FIGS. 6 and 7.

Figure 6:
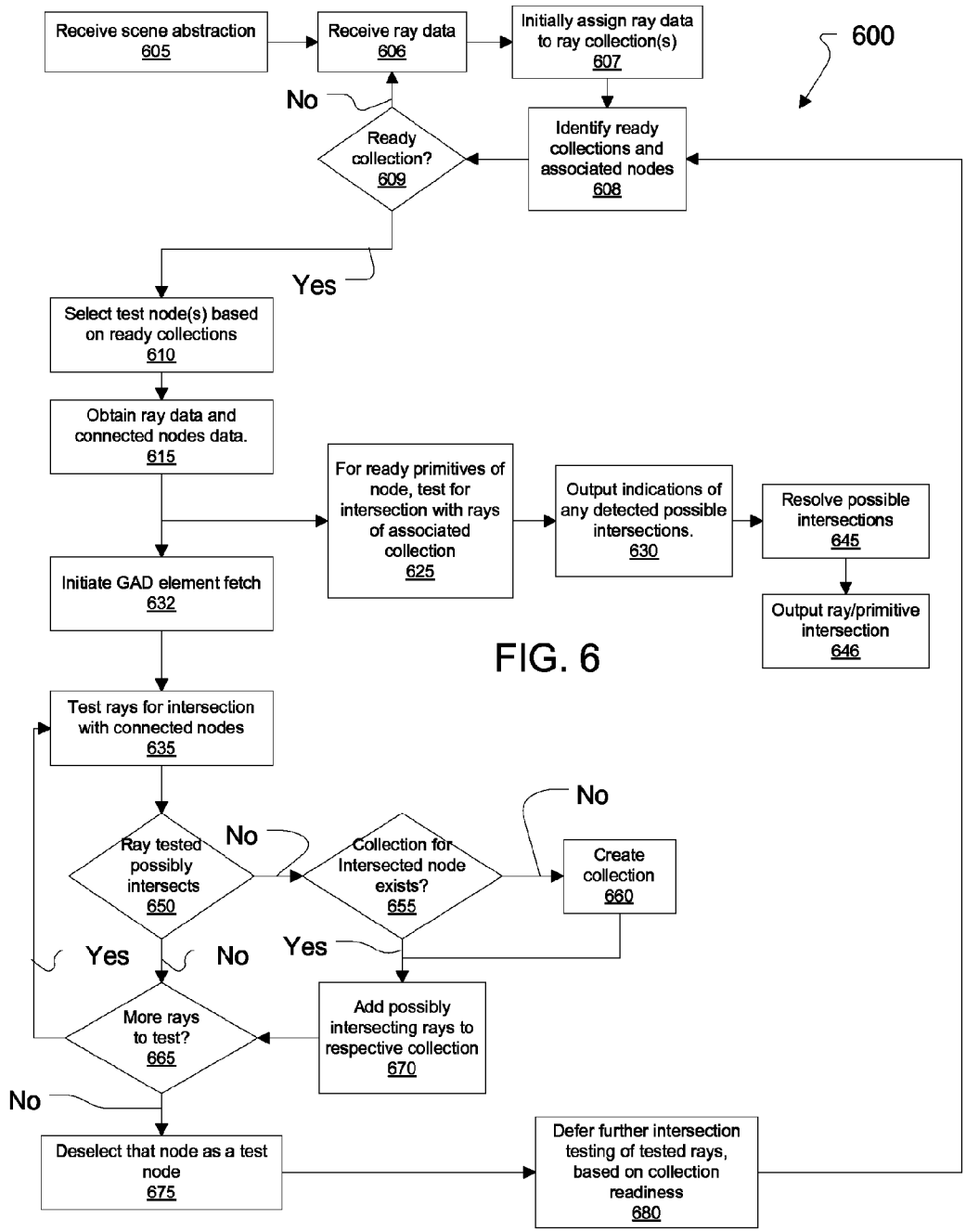
FIG. 6 illustrates exemplary method aspects that may be performed in an ITU.

The following description relates to a method 600 of intersection testing depicted in FIG. 6. The method will be described relative to ITU 350, for simplicity. In 605, at least a portion of a scene abstraction comprising elements of GAD bounding selections of primitives composing the scene is received in GAD storage 316. The scene abstraction includes information relating the GAD elements, and in an example such information comprises a graph mapping GAD elements to nodes of the graph and edges between pairs of the nodes. Ray data is also received (606) in memory 340 from ray source 305. Collection management logic 380 operates to initially assign rays to collections, where each collection is associated with an element of GAD. For example, an element of GAD may be a root node of the graph, and all rays received are initially assigned to one or more collections associated with the root node. Reception of rays may also be in groups sized to be a full collection, and each such collection can be treated like a collection identified in ray collection buffer 331, for example.

In 607, rays are assigned initially to a collection (e.g., a collection for a root node or a sphere bounding a camera origin). In 608, collection(s) ready for test are identified by, for example, flagging as ready any collection having more than a predetermined number of rays. In 609, it is determined whether any collection is ready, and if not then more ray data is received (606), and if a collection is ready then a selection (610) of the ready collections is made and nodes associated with those collections are identified as test nodes.

Focusing on processing of one collection, with the understanding that a number of collections may be tested in parallel, retrieval (615) of rays of the collection associated with the test node from memory 340 is initiated by collection management logic 380, by for example, providing addresses of such rays, which are stored as data in the collection, to memory 340, which provides the ray data on plural output ports. The ray data may be destined for one or more of test cells 310a-310n and test cells 340a-340n.

In particular, example test cells 310a-310n are for testing GAD elements for intersection while test cells 340a-340n are for testing primitives for intersection. At 625, primitives ready for test are tested for intersection in test cells 340a-340n, where 625 can include a determination of whether primitives are ready for test, by for example determining whether there is a more granular node of GAD bounding that primitive. Such a determination can include simply identifying all geometric shapes connected to the node associated with the collection under test, and any primitives connected can be provided for test to test cells 340a-340n.

Determining whether primitives are ready for test varies based on an implementation of the scene abstraction provided (i.e., based on the nature of the GAD). For example, the GAD comprises a graph of GAD elements, each bounding a selection of primitives, and arranged as nodes of the graph, where pairs of the nodes are connected by edges. The selection of primitives bounded by each GAD element, and which pairs of the nodes are connected can vary in implementations. For example, a first element of GAD can bound a first primitive that is not bounded by another GAD element that is either smaller in volume or bounds only a subset of the selection of primitives bounded by the first element (higher granularity). However, other primitives bounded by the first element may be bounded by one or more other (more granular) GAD elements that bound a subset of primitives or are smaller in volume. Thus, in step 625, the first primitive would be ready for test, as it is not bounded by a more granular GAD element.

Any such ready-for-test primitives would be provided to test cells 340a-340n, along with rays of the collection associated with the node being tested. Where more than one such primitive exists, as would frequently be the case, the rays of the collection can be loaded in test cells 340a-340n and each primitive can sequentially be fed through the test cells, such that each primitive is tested against all the rays more or less in parallel. In 630, indications of any intersections are output. Because only a closest intersection for a given ray is generally of interest, at 645 a closest intersection is determined. A previously closest intersection can be maintained with the ray data and collection management logic 380 can determine whether any detected intersection is closer than the stored intersection, updating the ray data as appropriate.

With regard to testing GAD elements bounded by the node selected for test (i.e., the GAD element associated with the selected node bounds other GAD elements), distribution of the rays from the collection to test cells 310a-310n is done, and then fetching of bounded GAD elements is initiated at 632, meaning that collection management logic 380 inputs addressing information to GAD storage 316, which outputs the addressed GAD elements to test cells 310a-310n. Where multiple GAD elements are bounded, as is usually the case, the elements can be arranged to be streamed serially to test cells 310a-310n by a serializing buffer, if block reads of multiple GAD elements is provided.

In the test cells 310a-310n, each ray of the collection is tested for intersection with the serially provided GAD elements, and where a ray is determined to intersect (650), it is determined (655) whether a collection for the intersected GAD element exists, if so, then the ray is added to that collection, room permitting, and if not then the collection is created 660, and the ray is added. Where an existing collection has no room, then a new collection can be created.

In some implementations, a 1:1 correspondence of a maximum number of rays in a collection to number of test cells 310a-310n is provided such that all the rays of a collection can be tested in parallel against a given GAD element. However, if more rays are provided in a collection, then a determination that more rays of the collection need to be tested (665) is performed, and if so then the method continues from 635.

Otherwise, the node selected for test can be deselected (675) as a test node, as all the rays of its associated collection will have been tested against bounded primitives, and/or bounded GAD elements, and thereby will have completed processing or have been distributed into other collections associated with other GAD elements. As such, the step 680 is performed that testing of the rays of this associated collection are not further pursued at this time, but rather may be deferred for an indefinite period as other collections are processed. The method 600 then returns to 608, where collection readiness is determined by collection management logic 380. Collection readiness determination can involve a number of calculations and determinations. Simplistically, it can entail determining or examining a fullness level of each collection and selecting the fullest of the collections. Because collections correspond to elements of GAD, other determinations can include determining to complete testing for a given element or elements of GAD, and selecting collections associated with those elements as ready for test. Alternatively, collection readiness can be determined that a given collection holds ray(s) that already have been completely tested through other portions of the graph of GAD elements, and completion of that ray depends on processing the given collection. If storage for ray collections is allocated in fixed size areas, then collection management logic 380 can also determine that a collection with only a small number of rays, and which has not had a ray added for some time should be selected as ready for test to free up the space used by that collection for other more productive collections. Also, a large number of rays initially may be received such that an available amount of ray collection storage space can be filled. Where ray storage is full, but other mechanisms for determining collection readiness do not trigger enough ready collections, random or heuristic selections of collections for further processing may be implemented. Other expediencies and selection criteria can be implemented.

With respect to ITU 350 and method 600, it was assumed that test cells 310a-310n and 340a-340n tested only one of GAD elements and primitives, respectively. However, in a sense, both the primitives and the GAD are geometric shapes, e.g., a triangle and a sphere. Therefore, there need not be an a priori determination whether one or the other of these types of shapes is bounded, or otherwise enclosed, by a particular node of GAD. Rather, a reference to the geometric shapes bounded by a particular node of GAD can be maintained, and the data associated with that reference can be fetched. In some aspects, a type of shape can be inferred for a size of the data describing that shape. Test cells 310a-310n and 340a-340n can be made reconfigurable to intersection test the type of shape provided to it. In such circumstances, GAD storage 316 and primitive storage 317 would each have a connection to each test cell 310a-310n and 340a-340n. It may however, continue to be expedient from a datapath complexity perspective not to have to run an independent connection between each memory and each test cell, as may be implemented to allow complete configurability and selectability of geometric shape testing in each test cell.

Figure 7:
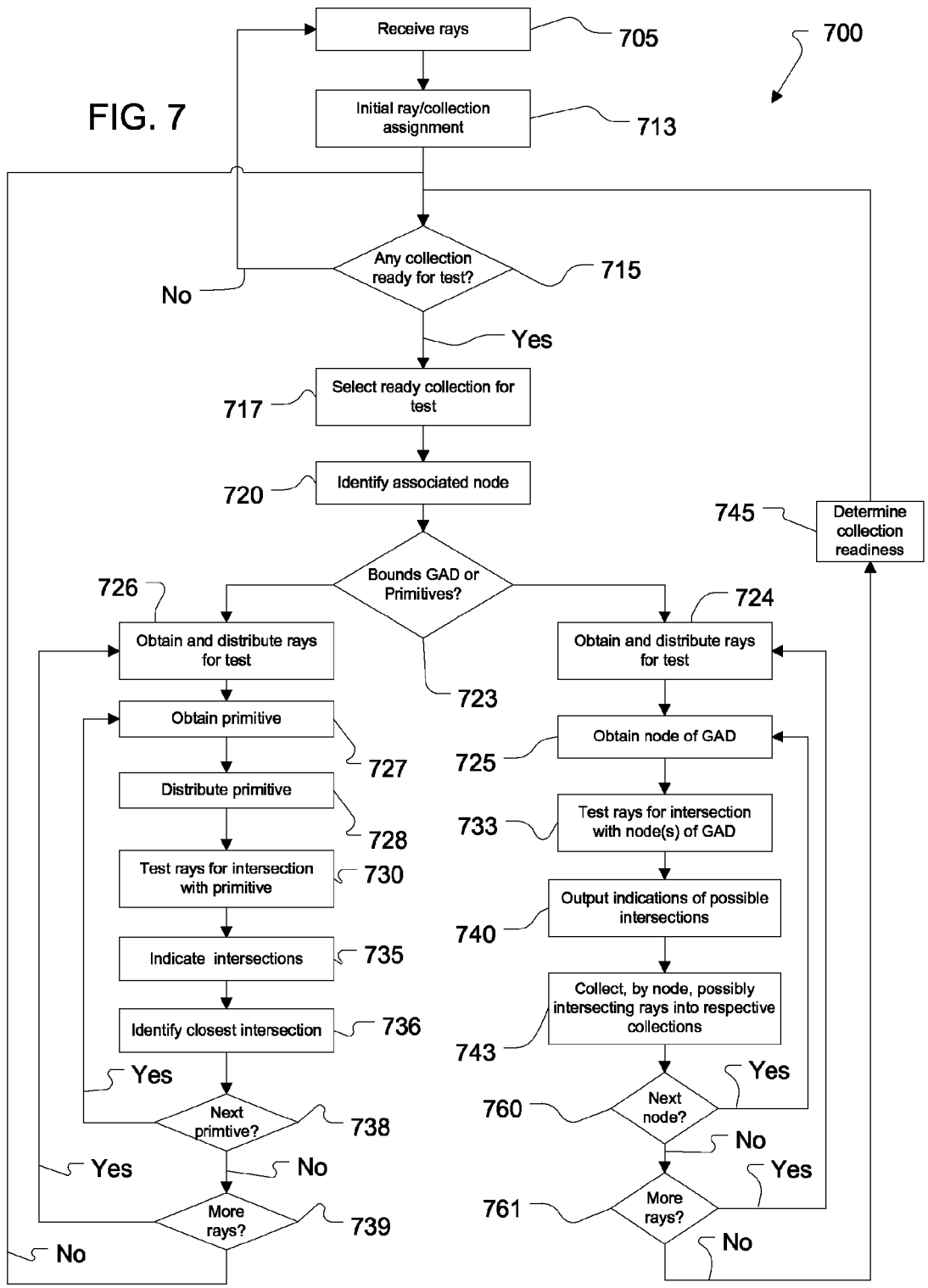
FIG. 7 illustrates further exemplary method aspects that may be performed in an ITU.

The following description relates to a method 700 of intersection testing depicted in FIG. 7, and which describes an implementation aspect where GAD for a particular scene is arranged in a hierarchical graph. In this example, the GAD is limited to bound either elements of GAD or primitives, rather than a potential combination of both. Such an example implies that only leaf nodes of the GAD graph would directly bound primitives (i.e., only leaf nodes would bound a selection of primitives that are not bounded by another, more granular, element of GAD).

In method 700 of intersection testing, actions may be attributed to a particular structure, and data may be identified as being stored in a particular memory resource. However, these are examples of an implementation, and method aspects are not limited to such examples. Method 700 commences with receiving (705) rays for intersection testing in a scene. The rays are initially assigned (717) to a ray collection associated with a node of GAD in the graph. For example, the rays can be assumed to intersect a root node of the graph, or a node encompassing a camera position from which the rays were emitted. After such initial assignment, it is determined whether any collection is ready for test (715). Because a large number of rays are usually initially transmitted, one or more ray collections are almost certainly ready for test, and a selection (717) of ready collection(s) is made. Initially transmitted rays can also be received as full collections and treated in an input queue like collections stored already in ITU 350 or ITU 500. In an example, one ready collection is selected, and the ready collection includes no more than one ray for each test cell of ITU 350 or 500, such that all the rays of a given collection can be tested in parallel. Collection management logic 380 or GAD test logic 505 may select ready collections for test, by for example maintaining a list of ready collections and taking a first entry on the list, or another entry. Flags indicating readiness of nodes can also be set and checked.

After selection of ready collection(s) (717), a node of the GAD graph is identified (720) for each selected collection by collection management logic 380 or GAD test logic 505, and each logic determines whether such node bounds either primitives or other GAD elements (i.e., other nodes). Node/collection associations may be managed within collection management logic 380 and GAD test logic 505. Differentiation between bounding primitives or other GAD elements can be made based on a bit indication, or based on determining what kind of references a collection may contain, or other acceptable means.

Concerning primitive bounding first, if the GAD element bounds primitives then collection management logic 380 or primitive test logic 350 initiates fetching (726) of ray data from memory 340/540, and distribution (726) of the rays among test cells 340a-340n and 540a-540n, respectively.

Also, each logic 380 and 530 initiates fetching (727) from primitive data storage 317 of bounded primitives. Such fetching can be performed as a block or as a stream, although in this example, each primitive is fed in common to each of test cells 340a-340n and 540a-540n, such that a stream of primitives can be created by a buffer or other suitable device if a block read from primitive data storage 317 is performed. In these example ITUs, it is contemplated that primitive data is fed directly from primitive data storage 317 to each test cell 340a-340n, as in these examples, different rays of a collection are distributed (728) among test cells for testing against a common primitive, as described below. Such a buffer is not a cache in the sense that primitives and/or GAD elements are not stored therein for repeated processing, but instead are generally discarded from ITU memory after testing against collection(s) of rays.

In ITU 350, ray distribution is initiated by logic 380, and ray data is provided directly from memory 340 to each test cell 340a-340n. For ITU 500, ray data can be obtained from memory by test logic 530, and provided to buffers 570-575. Test logic 530 may maintain a queue of requests for each memory bank 510-515, for situations where more than one ray in a given collection is stored in the same bank. In both cases, rays can be identified in a given collection by references, such as memory location references that identify a start of data for a ray, and rays can be of a predetermined size.

Thereafter, rays are tested 730 for intersection with the primitive provided to the test cells (i.e., each test cell has a different ray and tests that ray with a common primitive, in this example.) After testing (730) of rays for intersection, each test cell 340a-340n, 540a-540n indicates detected intersections. Because these intersections are of primitives and rays, the only intersection that typically matters is the first one. In ITU 350, rays can be tested for intersection out of order (i.e., can be tested against primitives farther from a ray origin first), and so a mechanism to track a closest intersection is provided. For example, data stored with the ray indicates a closest intersection for the ray identified to that point. This closest intersection data can be fetched by the test logic 380 and 530, but need not be provided to the test cells. Instead, test logic can retain that data, and compare distances of detected intersections returned from test cells to previously identified closest intersections, and where closer intersections have been identified, update appropriate ray data with that closer intersection. Although requiring more storage space, all intersections could be stored in the ray data and a closest one determined after complete intersection testing, or such data could be used for optimization and analysis.

After closest intersection resolution 736, it is determined whether more primitives bounded by the node of GAD remain to be tested (738), if so, then the process repeats from 727, where those primitives are fetched. In implementations, this step 738 can be implemented as a loop for a predetermined number of primitives. If no primitives remain to be tested, then the process returns to identify another collection ready for test (715).

In some examples, a 1:1 correspondence is maintained between a number of rays in a collection and a number of test cells 340a-340n or 540a-540n, such that all the rays of a collection can be tested against a primitive at once, and such that rays are stationary in the test cells as primitives are streamed to the test cells. However, where more rays exist in a collection than test cells, or if all rays were not tested, then method 700 can include a further loop point 739 where those additional rays are fetched 726, and the process then repeats from 726. Otherwise, method 700 continues from 715, where it is determined whether a collection is ready for test.

Concerning a collection associated with a node bounding other GAD elements, method 700 includes that GAD test logic 505 and collection management logic 380 would obtain and distribute (724) rays of the collection to test cells 540a-540n and 340a-340n, respectively. Similar to the primitive fetching, each of logic 505 and 380 initiates the production (725) of GAD elements for reception by the test cells, and in examples, the reception by the test cells of the GAD is like a serial stream. The GAD elements obtained (725) here are those GAD elements connected to the node associated with the collection (e.g., if a collection associated with node 220 of FIG. 2 were selected, then GAD elements for nodes 215, 241, 221, and 230 would be fetched.

Each ray of the collection is tested (733) in its test cell for intersection with the GAD element provided to the test cells. Indications of intersections are output (740) from the test cells to logic 380 and 505. Logics 380 and 505, where an element of GAD is tested in common among the test cells then records each detected intersection of the rays tested for that GAD element. Since testing in this example proceeds serially through the GAD elements, Logics 380 and 505 can record a reference to an intersecting ray in the collection associated with that GAD element, to collect by node the possibly intersecting rays (743). In a case where other rays already were annotated for intersection with that GAD element (i.e., because collections of rays can be stored and deferred until ready, some rays could have been identified as intersecting in previous testing, and testing of those rays would occur when the collection was later determined ready for processing).

It is determined (760) whether more GAD elements for connected nodes remain to be tested, and if so, then such nodes are obtained (or loaded) into the test cells. If all GAD elements for connected nodes were tested, then at 761, it is determined whether more rays of the collection remain to be tested (where a 1:1 correspondence of rays to test cells is not implemented). If all rays were tested, then processing continues with determining readiness of collections currently existing (745) and then at 715 where the readiness conditions are used to determine whether to obtain more rays (705) or to proceed with further collection testing. If more rays are to be tested (761), processing continues from 724.

Of course, it should also be understood that where more primitives, GAD elements, or rays are to be tested, then the fetching of any such data can occur in parallel with the testing, and the serial nature of the explanation does not imply serial performance of the process.

Also, because testing resources exist for both primitives and GAD elements in ITU 350 and ITU 500 (i.e., test cells 340a-340n and test cells 540a-540n, respectively), the steps of identifying collections ready for test can occur in parallel for (1) collections that are associated with a GAD element bounding primitives and (2) for collections bounding associated with GAD elements bounding other GAD elements (i.e., nodes of the graph bounding other connected nodes.) Therefore, multiple collections can be in process at a given time.

Because the output from testing rays for intersection with GAD elements differs from testing the same rays for primitive intersection (i.e., intersection with a GAD element results in collection into a collection for that GAD element, while intersection with a primitive results in determination of a closest intersection with that primitive, and output of such intersection), conflicts to write back collection data or output intersections should not normally occur, even where a particular ray happens to be in two collections being tested in parallel. If further parallelism were to be implemented, for example, by testing multiple collections of rays for primitive intersection in multiple instantiations of test cells 340a-340n, then features can also be implemented to enforce orderly completion of such testing, such as storage of multiple intersections, or lock bits, and the like.

In sum, method 700 includes receiving rays, assigning them to collections, selecting for test ready collections, where readiness can be algorithmically determined, assigning rays of the selected collections to appropriate test cells and streaming appropriate geometry for intersection test through the test cells. Outputs depend on whether the geometry are scene primitives or GAD elements. For rays tested against GAD elements, the GAD elements are identified based on graph connection with the node associated with the collection being tested, and rays are added to collections associated with the GAD elements being tested. The collections are reviewed for readiness and selected for test when ready. For ray intersections with primitives, a closest intersection is tracked with the ray. Because rays are tested when associated with ready collections, it is implicit that intersection testing for a particular ray is deferred until a collection with which it is associated is determined ready for testing. Rays can be collected coincidentally into multiple collections, which allows such rays to be tested against disparate portions of scene geometry (i.e., they need not be tested in order of traversal).

As discussed above, in some implementations, elements of GAD can be selected and interrelated with each other such that a particular GAD element does not bound directly both another GAD element and primitives, and instead primitives are directly bounded by a distinct GAD element (this implementation can be called a homogenous implementation, in that GAD elements and primitives are not "mixed" within a given element of GAD). This GAD arrangement may be useful because it facilitates testing of GAD elements and primitives in test cells optimized or otherwise configured for testing that particular type of shape for intersection. This implementation choice may affect an allocation of rays to test cells, where test cells are optimized for testing the GAD elements or primitives, since it would be preferable, where available, to allocate each type of shape to an optimized tester. Method 700 can be adapted for any construction of GAD, whether homogeneous or otherwise based on the description provided herein.

In the above methods 600 and 700, rays were loaded from a memory based on information provided in a collection of rays. Therefore, such loading may include determining respective memory locations where data representative of each ray is stored. Such data may be comprised in the ray collection, in that a ray collection may include a list of memory locations or other references to storage, at which ray data for the rays in that collection are stored. For example, a ray collection may comprise references to locations in memory 385; these references may be absolute, offset from a base, or another suitable way to reference such data.

Also, methods 600 and 700 were described from the perspective that ray data would be "stationary" in test cells as either primitives or GAD elements were cycled through the test cells. However, implementations can also fix either primitives or GAD elements in test cells and cycle rays through them. Such a situation may be advantageous where a number of ray collections associated with the same GAD element were ready for test. The operation of ITU 350 and ITU 500 can be altered to accommodate such variations or opportunities as they present themselves. Other implementations may be provided, including duplication of a ray in multiple test cells, such that each test cell tests a portion of the elements of GAD for intersection.

More complicated test cells may also be provided, which can cycle through both a list of the rays and a list of the elements of acceleration data. In such an implementation, each test cell could test a collection of rays for intersection with all appropriate elements of GAD. However, such an implementation would likely require a larger memory 440 and a higher bandwidth interface to keep all the test cells supplied with rays and elements of GAD for a complex scene in view of present technology limits. As technology advances, such an implementation may become more desirable, and could be viewed, in a sense, as replicating ITU 350 multiple times, since keeping either a ray or a particular element of GAD stationary in a test cell would continue to have advantages, including that each test cell would require a smaller working memory, which in implementations having dozens, hundreds, or even thousands of test cells, is a practical advantage.

Example methods and apparatuses can identify exploitable latent parallelism among rays. As described with respect to FIG. 4, above, a memory in an ITU, such as ITU 350 or ITU 500 would be able to store a given maximum amount of rays. It is to be expected that the maximum number of rays that can be stored in such an ITU is less than a number of rays that would be tested to completely render the scene, given considerations such as complexity and cost. Therefore, rays can be conditionally accepted during rendering of a scene by the ITU. A condition of accepting new rays from the ray input is that the memory has space available for storing data representative of the new rays. The rays can be accepted in numbers approximating a full collection, and can be identified as ready for processing against a default group of shapes (e.g., a root node of a graph of GAD elements).

As previously addressed in many examples, the ITU stores (e.g., causes to be stored) in a memory information representative of rays previously received from the ray input. The ITU, for these rays, maintains an association of each ray with one or more ray collections of a plurality of collections. The ITU also maintains indications of collection fullness for the plurality of collections stored in the memory. These indications may be respective flags indicating full collections or may be numbers representing a number of rays associated with a given collection.

The ITU selects rays for intersection testing on a collection by collection basis (as described above), and here, the ITU selection is biased to select full collections from among the plurality of collections. Where full collections are not available, new rays are selected for testing. Where full collections and new rays are not available (e.g., because there is no memory available to store them, and hence they are not accepted), partially full collection(s) from among the plurality of collections are selected by the ITU. The ITU accesses an association of ray collections to respective groups of shapes (which was identified in previous examples as a graph of GAD elements, for example, or groups of primitives bounded by an element of GAD. The ITU operates to indicate intersections and process them largely as described above. Selecting partially full ray collections encourages product of secondary rays that increase available rays from which to identify parallelizable ray collections. Here, secondary rays is viewed as including any ray generated as a result of an identified ray/primitive intersection, and the ray involved in the intersection need not have been a camera ray, and thus "secondary rays" can be any number of ray/primitive intersections removed from a camera ray. Each time another ray is emitted as a result of shading a ray/primitive intersection, the new ray can be considered as a new "generation" for convenience. Thus, in many described inventive aspects herein, an advantage is that these aspects function to collect rays from any generation together for testing, and in some operational modes encourages generation of many rays without regard to their respective generations, to provide a better distribution of rays in the scene to allow more parallelization of ray intersection testing.

Also, because each ITU 350 or ITU 500 includes a finite number of test cells, and requires some finite time to determine whether a given ray intersects with a shape, an ITU has a maximum throughput. In these examples, maintaining actual throughput closer to a maximum throughput of an ITU according to these disclosures indicates efficient usage of testing resources. Methods and apparatuses described provide for efficient intersection testing by predominantly testing full collections of rays. Also, it was described above that a sequence of ray collections can be tested in the ITU 350 or 500, and groups of primitives can be cycled through for each ray collection (e.g., 32 ray collections can each be tested against 32 GAD elements). Therefore, inputs specifying what collection of rays to test next can be viewed as a sequence of ray collections. Preferably, this sequence is filled with full collections, either of previously inputted rays, or of new rays. However, at times, it has been found to be desirable to stimulate production of a wide variety of secondary rays from potentially a variety of origins and directions by selecting partially full collections, for example in a round robin fashion.

Figure 8:
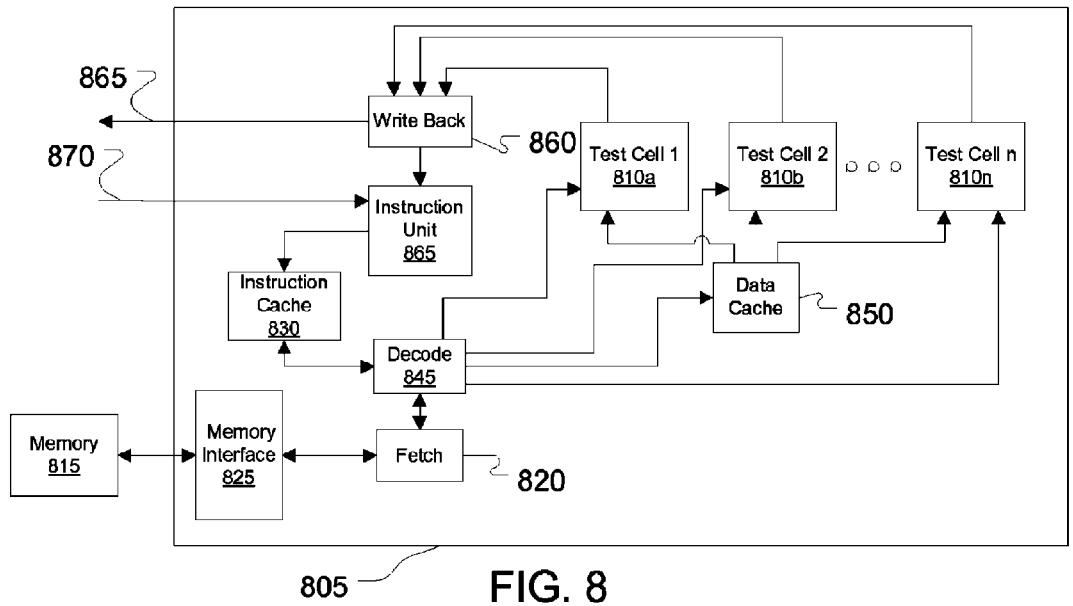
FIG. 8 illustrates a processor oriented implementation for intersection testing according to described testing aspects.
Figure 9:
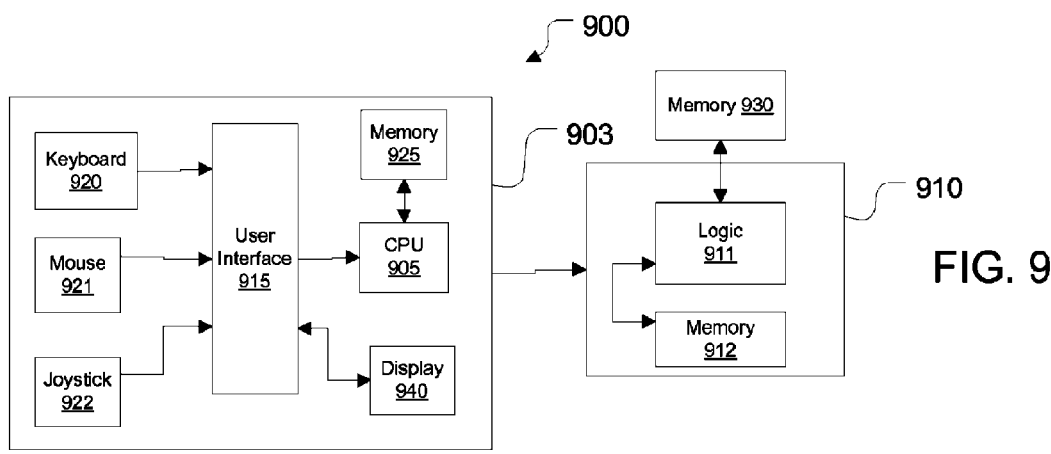
FIG. 9 illustrates a host system interfacing with an ITU according to these aspects.

The above described ITUs are examples of implementations that focus more on hardware control, and which may be more suitable for implementation as a dedicated accelerator. However, inventive aspects can also be implemented in a more software oriented implementation that may use special purpose instructions. Aspects of such an implementation are presented with respect to FIG. 8. In particular, a processor 805 comprises a fetch unit 820 coupled to a memory interface 825, an instruction cache 830, an instruction decoder 845, and a data cache 850. Data cache 850 feeds test cells 810a-810n. Instruction decoder 845 also provides input to test cells 810a-810n. An instruction generator 865 provides instruction input to instruction decode 845. Test cells output indications of detected intersections to write back unit 860, which in turn can store data in data cache 850. Output from write back unit 860 is also used as input to instruction generator 865 when generating instructions. It is contemplated that instructions used in such a processor 805 may be of a single instruction, multiple data variety, where the instructions processed in the test cells are intersection tests between defined surfaces and rays.

In an example, the "instruction" may include one of a primitive or an element of GAD, and the multiple data elements may include separate rays for testing against the primitive or element of GAD provided as the "instruction." The additional information with the instruction can be complicated or simplistic. For example, if processor 805 is a complicated, full-featured processor, then it may also have a large instruction set, and there may be a number of bits needed to differentiate an intersection test instruction from other instructions. Also, a variety of intersection test instructions may be provided, including for different primitive shapes and different GAD element shapes, or even for different testing algorithms, as appropriate.

In a typical example, each intersection test instruction would contain a reference to a geometry element, either being an element of GAD or a reference to a primitive, and references to a number of rays to test for intersection with the geometry element. Decoder 845 interprets the instruction to determine the reference to the geometry element, and initiates a fetch of the element through fetch 820 and memory interface 825. In some implementations, decoder 845 can look ahead a number of instructions to initiate fetching of geometry elements needed in the future. The geometry element can be provided by fetch 820 to decoder 845, where decoder 845 provides the geometry element to test cells 810a-810n. Decoder 845 also provides instruction information appropriate for test cells 810a-810n to perform the desired test, where multiple tests are possible.

Decoder 845 also provides the ray references from the instruction as functional addresses to data cache 850, which provides respective data sufficient for intersection testing of each ray to each of test cell 810a-810n. Data associated with the ray, which is not needed for intersection testing need not be provided.

The geometry element is tested for intersection with respective rays in each test cell 810a-810n, and an indication of intersection is output from each test cell 810a-810n for receipt by write back 860. Depending on the nature of the geometry element tested, write back 860 performs one of two different functions. Where test cells 810a-810n were testing a primitive for intersection, write back 860 outputs indications of each ray that intersected the primitive being tested. Where test cells 810a-810n were testing an element of GAD, write back provides the outputs of test cells 810a-810n to instruction unit 865.

Instruction unit 865 operates to assemble future instructions that will instruct test cells in further intersection testing. Instruction unit 865 operates with test cell 810a-810n input specifying which rays intersected a given element of GAD, instruction cache 830 and with inputs from GAD input 870, as follows. With the inputs from test cells 810a-810n, instruction unit 865 determines, based on GAD inputs, elements of GAD that are connected to the element of GAD specified in the inputs from the test cells 810a-810n. Instruction unit 865 determines whether an instruction stored in instruction cache 830 already exists for each element of GAD identified as connecting, and whether that instruction can accept any further ray references (i.e., are all data slots of the instruction filled). Instruction unit 865 adds as many of the rays identified as intersecting in the test cell input to that instruction and creates other instructions sufficient for receiving the remaining ray references. Instruction unit 865 does this for each element of GAD identified as connecting with the element identified in the test cell input. Thus, after processing the test cell input, rays identified as intersecting are each added to instructions specifying testing of the rays against connected elements of GAD. The instructions may be stored in instruction cache 830. Instructions may be organized in the instruction cache 830 based on the organization of the elements of GAD received from GAD input 870.

For example, GAD input 870 may provide a graph of GAD, where nodes of the graph represent elements of GAD, and pairs of nodes are connected by edges. The edges identify which nodes are connected to which other nodes, and instruction unit 865 may search instruction cache 830 by following edges connecting nodes, in order to identify which instructions are already in the cache for a given element of GAD, and where new rays may be added. Where multiple instructions exist for a given GAD element, they may be linked in a list. Other methods, such as hashing a GAD element ID to identify potential locations in instruction cache 830 where relevant instructions may be found can also be implemented. Instructions can also reference a node of GAD under test, such that the instruction would cause fetching of connected nodes of GAD, in response to the instruction being issued and decoded. Each such connected element can be streamed through test cells 810a-810n for test with respective rays maintained in each test cell.

Thus, a processor implemented according to these examples would provide functionality to obtain or otherwise create instructions that collect rays identified for intersection with a first node for intersection test against connected nodes. As with the examples described above, if the GAD provided to processor 805 is hierarchical, then the graph of GAD may be traversed in hierarchical order. The intergenerational ray collection aspects described above with respect to ITUs 350 and 500 can also be applied to the system described with respect to FIG. 8.

The example connections and sources of GAD are exemplary and other arrangements are possible. For example, memory 815 may be a source for GAD elements.

In practical ITU implementations, intersection test must be performed at a selected precision level (e.g., 8 bits, 16 bits, 24 bits of precision, etc.). In some implementations, an implemented ITU can perform intersection testing at high precision, such that a location of the intersection between a ray and a GAD element or primitive at a desired precision can be determined without further testing.

In other aspects, implemented ITUs can perform a lower precision, preliminary test for intersection between rays and GAD elements/primitives, which may result in detection of more possible but false intersections than a higher precision test (i.e., false positive intersections). After the detection of these preliminary intersections, a higher resolution intersection test can be conducted to determine which of these primitives a given ray first intersects. In most common shading algorithms, the first intersected primitive is the primitive used in ray shading calculations. Performing a lower precision test first can avoid doing a higher precision, more computationally intensive intersection test for rays and primitives that clearly do not intersect. A more precise indication of intersection location may be indicated with a geometry-centric representation of that information. For example, the intersection location can be indicated relative to one or more of vertexes describing a triangular primitive.

The above methods and systems that implement them can be viewed as implementing processes that can accept rays for intersection testing with respect to elements of a scene, the processes operate to test rays against elements of GAD to form collections of rays based on whether each ray intersects each GAD element. Thus, a result of such testing is that a number of collections can be formed, each associated with a GAD element. Because in these examples GAD elements are arranged in a graph, with edges connecting pairs of nodes, a next step for testing any given collection of rays is to test the rays of the collection for intersection with GAD elements (i.e. nodes of the graph) connected by edges to the node to which that collection is associated. However, that next step is deferred until the collection of rays is ready for test, in favor of pursuing testing of other rays for intersection. First, the processes can determine whether another collection of rays is ready for test, and if so, then that collection can be scheduled for test. If no other collection is ready for test then if there is available memory space to accept more rays for intersection testing, then more rays are accepted and tested. However, if there is not enough available memory space, then collections of rays can be selected for testing, potentially pseudorandomly or employing a heuristic. Such heuristic selection can continue until memory space is made available or collections are determined ready, for example, by reference to a fullness indication. Then, if collections are ready, they are tested, and if memory space is available, new rays are accepted and tested.

Heuristic selection methods can be identified by testing or otherwise monitoring utilization rates or amounts of intersection testing resources, and if a heuristic can provide better long term or average utilization, then it may be used.

The process thus implemented primarily pursues intersection testing of full ray collections, and secondarily seeks to fill an available memory space with rays being processed. Where there are no full collections and insufficient memory space available, collections are tested from a pseudorandom or heuristic selection. The processes thus advances testing of rays with sufficient spatial coherence, when possible, while testing as many rays as practical given a provided memory storage, and where an insufficient number of rays have spatial coherence for more efficient intersection testing, generation of rays from a plurality of different origins and directions is encouraged to allow aggregation of a sufficient number of rays to increase efficiency of intersection testing. These aspects are accomplished elegantly in the example implementations. However, other implementations may also employ the disclosure of such aspects, and are considered within the scope of the invention and its equivalents. These aspects can be implemented within ITU 350 or ITU 500, within process(es) resident on a host, such as driver processes, and the like, or cooperatively between the intersection testing resources and drivers for the intersection testing resource. Host processor interaction will be further described with respect to later figures.

Still other aspects that can be discerned from the above disclosures include that these aspects provide for iterative exclusion or narrowing of primitives that need to be tested for intersection, while deferring testing of rays for intersection until a suitable amount of rays is collected and ready for test against a defined set of objects. The rays of any collection can include camera rays, or any other type of ray that resulted from shading calculations or other operations for sampling light or shadow, such that the methods have an effect of allowing more structured and predictable accesses to scene acceleration data and scene primitives when testing a number of rays for intersection, even where those rays may have dissimilar origins and directions. In other words, such exemplary methods allow identification of rays that have different origins, directions, and purposes but still can be tested for intersection in parallel with common elements of acceleration data or primitives.

The identification of such rays can be dispersed over time, while other rays and other acceleration data or primitives are tested. In practice, these aspects also manifest themselves as collecting rays of different generations for testing in parallel, meaning for example, that a primary camera ray may be tested for intersection against GAD elements in parallel with a secondary ray spawned to test a specular reflection of an entirely different object in an entirely different part of the scene, where that secondary ray may be related to a completely different camera ray. To summarize, these methods and systems operate to extract latent ray coherency from large groups of rays traveling in a scene having any number of different origins and directions, and use that extracted latency to enable parallelized intersection testing and conservation of memory bandwidth to allow direct access to larger cheaper memories without intermediating caches of scene primitives or GAD elements. This method can also include specifically allowing, and even stimulating, widespread scattering and availability of secondary rays (i.e., rays that are not camera rays), regardless of what camera ray they relate to, or their respective origin and direction, and collecting such rays and potentially other rays (e.g., camera rays), over time by testing rays for intersection with GAD elements. As such, implementations of such a method may be conceived as including variations on the dedicated hardware approach and the SIMD approach examples described above as operable to collect and refine collections of multigenerational rays through a rendering time based on intersection with GAD elements.

Most of the above aspects were described from the perspective that separate ray data and ray collection data were maintained. However, in some implementations, that separation need not be so explicit or apparent, in that ray collection data and ray data can be maintained as a content associative database for example, where associations between collections and rays, and between collections and elements of GAD are maintained and used to identify rays associated with collections for test, and also elements of GAD associated with the collections.

The above description relates mostly to functionality and implementation of it within an intersection testing resource. Such intersection testing resource generally would be used within a larger system, or group of systems that interface with application(s) needing rendering services. The systems may run drivers and other processes that receive data for scenes to be rendered, and interface with the intersection testing resource to accomplish the intersection testing portion of the rendering.

The following description provides an overview of such systems and groups of systems, and subsequently, there is description of examples of what sorts of processes and functionality can run on such systems. Computer system 900 comprises a host system 903 which comprises a CPU 905 interfacing with a memory 925 and a user interface 915 that may receive input from keyboard 920, mouse 921, and joystick 922, for example, and provide output to display 940. Host system 903 interfaces with an intersection testing resource 910, which can be implemented with logic 911 interfacing with onchip memory 912 (e.g., SRAM) and off-chip memory 930 (e.g., DRAM). The combination of logic 911 and memory 912 may implement the ITU 350 or the ITU 500 described above. Software runs on CPU 905, including a driver for the testing resource 910. The driver would provide rays to logic 911, and would receive identified ray/primitive intersections to be used in shading calculations, and other calculations necessary for production of a rendered scene for display.

Figure 10A:
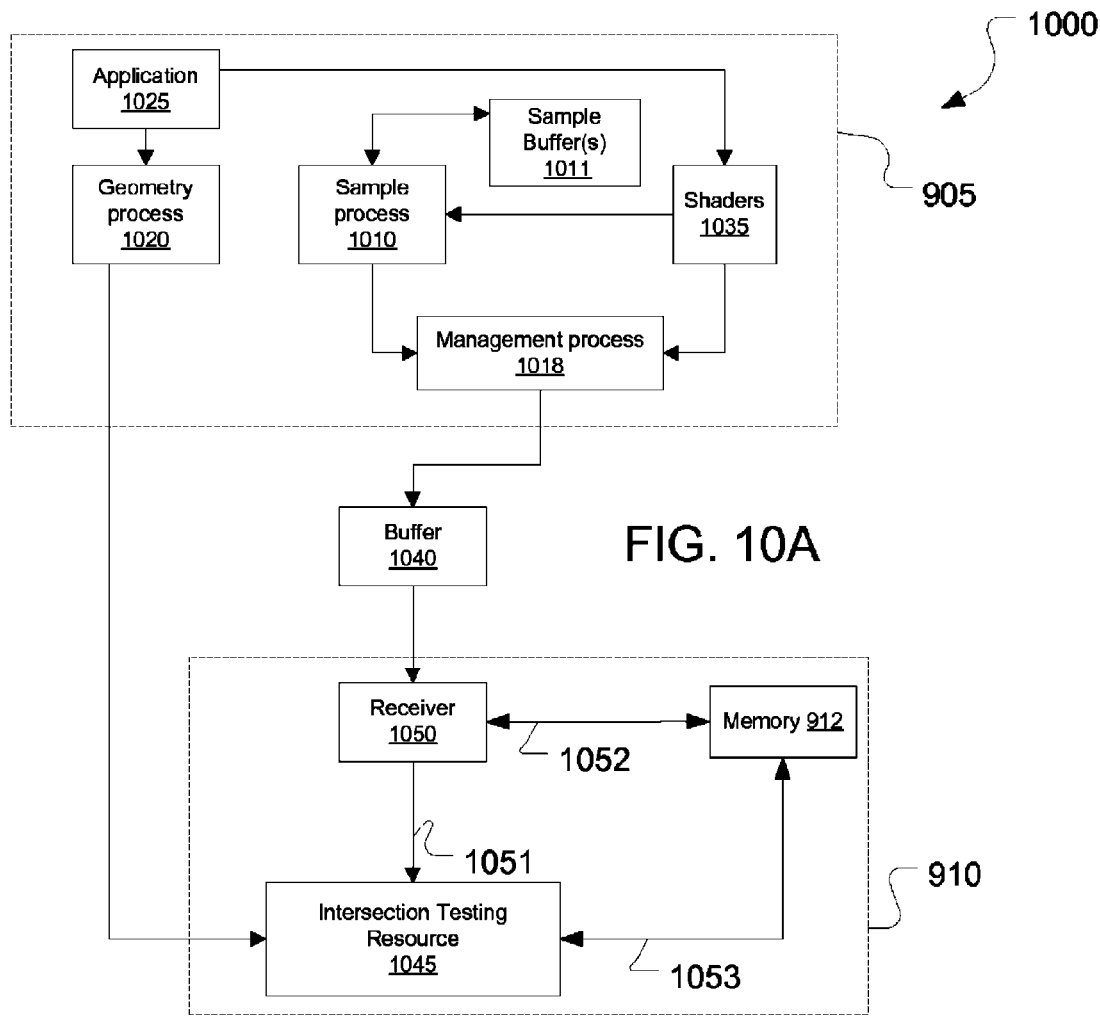
FIG. 10A illustrates further aspects of the host system and further aspects of exemplary ITUs.
Figure 10B:
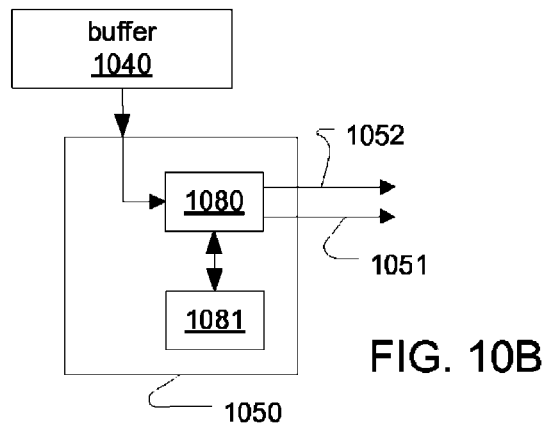
FIG. 10B illustrates a further variation on a component of the ITU of FIG. 10A.

FIG. 10A illustrates an example of a rendering system 1000 that CPU 905 may provide processing resources for application code 1025 that may require rendering of scenes with ray tracing. For example, such applications may include video games, 3-D modeling and design tools, and any visualization tool. CPU 905 thus processes information descriptive of a scene to render from such application code, and can provide such information to geometry process 1020, sample process 1010, and shader processes 1015, for example, through application programming interfaces, function calls or other suitable implementation. The information may include geometry, which may include primitives representing a wireframe for the scene, or arrays of pixels from which a wireframe can be constructed, or another suitable means for representing surfaces of objects (broadly considered) in the scene to be rendered. FIG. 10A also illustrates that CPU 905 communicates with intersection testing resource through a buffer 1040 for storing information descriptive of rays to be intersection tested. A receiver 1050 implemented in intersection testing resource 910 receives the information descriptive of the rays. The following describes examples of how such ray information can be structured to efficiently communicate a large number of rays for intersection testing.

Representing Rays for Storage and/or Transmission

An arbitrary ray is represented by a 3-dimensional origin and a direction vector in 3-space. This representation requires 6 number values, at a precision that is adequate to express "world space" (i.e., provide an absolute position and direction for the ray in the scene, without relative references. Such a representation has been found to be adequate for most ray tracing applications, as the bandwidth and storage requirements for a number of rays being traced at a given time is reasonable small compared to other demands on system bandwidth and storage in such systems. However, for a ray tracing system architecture where a host processor runs a software driver that interfaces with a hardware accelerated intersection tester for rays created by the driver, and where that tester provides for testing much larger numbers of rays in parallel against scene primitives and/or graphical acceleration data elements, bandwidth and storage requirements for ray data transfer to the hardware accelerator has been found to be a limiting factor.

Rendering system 1000 may employ the ray data transmission/reception efficiency aspects disclosed herein. Sample processes 120 operate to maintain a 2-D plane of pixels representative of a scene that will be displayed (and for which the colors of the pixels is determined by ray tracing). Sample processes 120 may maintain a buffer for accumulated pixel light energy in scene buffer 1011 (in practice, a number of buffers for such light energy may be maintained, and this abstraction is representative of the generalization of such implementation details). The pixels of scene buffer 1011 may be outputted after completion of rendering for a given scene. Sample processes 120 also emit camera rays for intersection testing in intersection testing resource 1045 against primitives composing the scene. These emitted camera rays can be outputted first to a buffer 1040.

Geometry process 1020 may produce scene primitives and geometry acceleration data from lists of vertices provided by application 1025. The primitives and acceleration data may be provided to ITU 910. Various interface components may intermediate this communication and subsequent storage, as necessary and/or desirable.

Shaders 1035 represents any number of different code portions, processes, and other implementations to perform color calculations and other tasks to be done for identified intersections between scene primitives and rays. Such tasks can include generation of secondary rays, like shadow rays, and reflection rays, as discussed below. Shaders 1035 also output such secondary rays to buffer 1040. As will be described in more detail below, Shaders 1035 can also receive indications of identified ray/primitive intersections from ITU 910.

Buffer 1040 may include a dedicated port for each of sample processes 120 and shaders 1035. Buffer 1040 also has an output port to ITU 910. Buffer 1040 may be managed either by host 103 or ITU 910, or by circuitry or software internal to buffer 1040. Buffer 1040 may simply be a FIFO queue, or may be more complicated, such that it can implement out of order ray selection or reordering of rays. Buffer 1040 may also be part of ITU 910.

Before describing in more detail operation of sample processes 1010, shaders 1035 and receiver 1050, examples of types of rays which may be tested for intersection in the scene are provided, along with characteristics, such as data sufficient to define each ray, relevant to operation of the above processes and components.

Ray Types

Camera Rays

Figure 12:
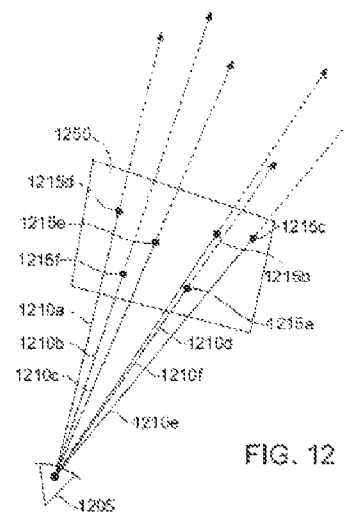
FIGS. 11-14 illustrate examples of rays that can be more efficiently represented through implementing aspects described with respect to FIGS. 15 and 16.

Aspects of camera rays are discussed with respect to FIG. 12. Camera rays are emitted from a camera 1205, which is a convenient analogy to motion pictures, and represents a location from which the scene will be viewed. Camera 1205 is not a physical entity, but rather a point or points in 3-D space. Camera rays include pinhole camera rays (i.e., all rays share the same origin) and non-pinhole camera rays (i.e., rays have similar origins, but not precisely the same origin). Rays from a pinhole camera have directions that can be derived from an x and y position that lies on the image plane. In FIG. 12, rays 1210a-1210f are illustrated. Each ray 1210a-1210e intersects image plane 1250. Locations at which each ray intersects image plane 1250 are identified respectively as 1215a-1215f.

For non-pinhole cameras, a defined relationship, such as programmatic definition, enables the translation of x and y positions on the image plane into complete ray origins and directions, by referencing camera attributes shared among rays emitted from that camera. Camera rays can therefore be expressed as two number values in conjunction with the shared camera attributes, at a precision that is adequate to express a position on the image plane, accounting for any over-sampling and/or multi-sampling desired to be implemented.

In cases where it is desirable to emit camera rays for an entire frame, or a region of the image plane, a single token can express these rays, where the token provides a programmatic relationship specifying intervals of ray emission or a sampling technique that causes rays to be emitted from the camera for intersection with the image plane at locations defined by or otherwise derivable from the relationship or sampling parameters of the sampling technique. All of these ray emissions and related calculations can be performed by sample processes 1010.

Reflection Rays

Figure 11:
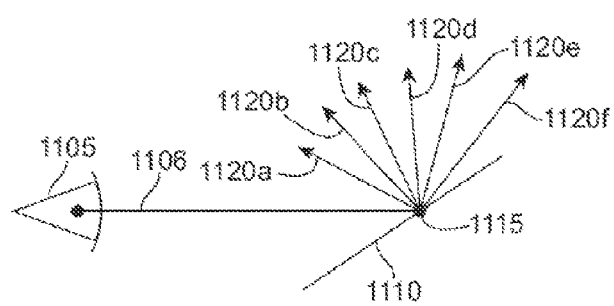

Aspects of reflection rays are described with respect to FIG. 11. Reflection rays result from an intersection between a ray and a primitive, where shading calculations determine that reflection rays should be emitted for further intersection testing in the scene. By particular example, a camera ray 1106 is emitted from camera 1105, and camera ray 1106 intersects primitive 1110 at point 1115. This primitive/ray intersection pair is outputted from ITU to shaders 1035. Shaders 1035 in turn determine that reflection rays 1120a-1120f should be emitted from primitive 1110 having an origin at point 1115.

As can be seen, shading operations often involve creating many child rays from a single origin. To efficiently transmit these rays to the intersection testing unit, the origin can be transmitted once as shared data for the child rays, and for each child ray, only a direction vector is transmitted. Optionally, instead of a unit vector in 3-space, each ray direction may be transmitted as a pair of angles.

Monte-Carlo Origins/Occlusion Rays

Figure 14:
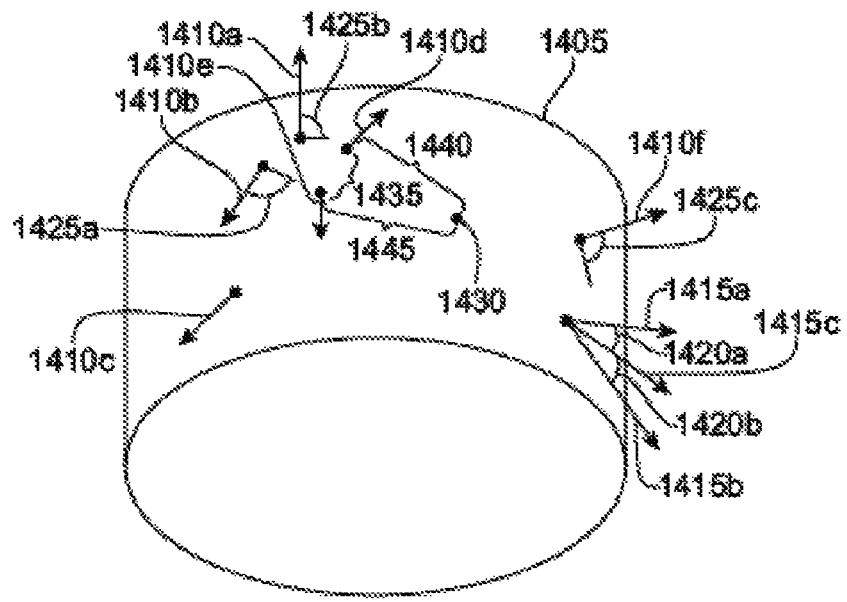

Monte-Carlo origin/occlusion rays are described with respect to FIG. 14. Some lighting techniques, such as many Monte-Carlo sampling techniques, ambient occlusion, and other techniques, sample multiple points on a hemisphere. Rays emitted for these techniques can also be transmitted and/or stored more efficiently using a technique similar to that used for reflection rays, described above. However, instead of providing a fixed common origin for each ray, ray origins are described such that they can be regular, random, parametrically, and/or programmatically derived. Therefore, origins for such rays need not be independently specified and ray transfer efficiency can be increased by sending information sufficient to construct origins and directions for each of the rays. For example, it can be noted that all rays are to be emitted in a direction perpendicular to a tangent at a point on the hemispherical surface. These points on the surface can be described by a density function.

FIG. 14 illustrates a hemispherical surface 505, from which various rays can be emitted, e.g., rays 1410a-1410f, and rays 1415a-1415c. Concerning rays 1410a and 1410b, these are illustrated as being parameterized in part by angles 1425a and 1425b, which are measured with respect to local surface tangent vectors. In the particular example of FIG. 14, rays 1410a-1410f can be described by angles, such as angles 1425a and 1425b. An origin for each ray can be determined by relative distances from other ray origins, e.g., distance 1435. Origins can also be expressed or otherwise determinable with respect to a reference point, such as reference point 1430, and as illustrated by distances 1440 and 1445 to each of rays 1410d and 1410e, for example. Another example parameter situation that can exist includes an angle between rays emitted from a common origin, e.g., rays 1415a-1415c, where such angles are identified as angles 1420a and 1420b. In other situations, rays could be emitted at random or pseudorandom intervals from surface 1405, as illustrated by an origin of ray 1410c versus other rays illustrated in FIG. 14. Such rays can be described by statistical methods.

Therefore origins of such rays can be described as being at regular intervals, dispersed randomly or pseudorandomly, or otherwise parametrically or programmatically derived. As such, instead of explicitly providing an origin and direction for each ray, parameters or programmatic definitions are transmitted and used to determine, at the ITU, an origin and a direction for each ray.

Instant Global Illumination/Shadow Rays

Figure 13:
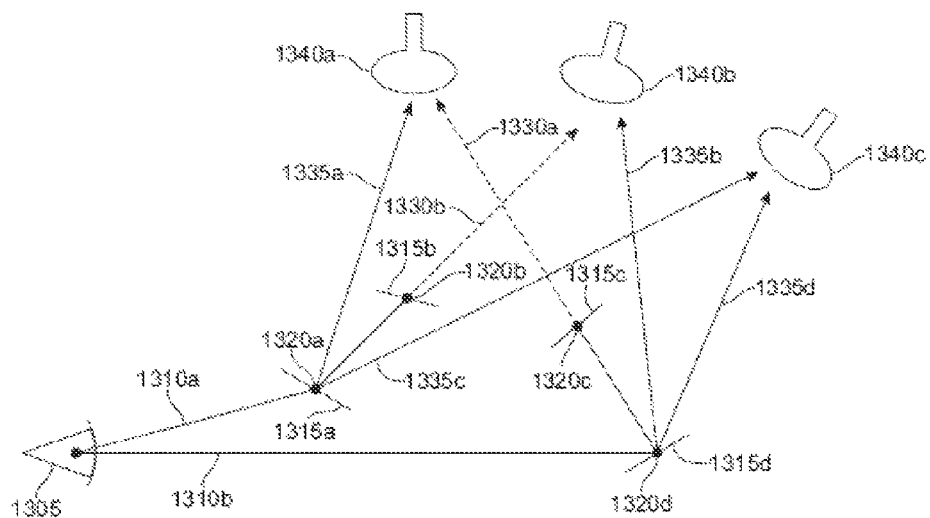

FIG. 13 is used for describing aspects relating to lighting techniques, such as Instant Global Illumination, which sample known light sources with shadow rays originated from an intersected primitive, or other origin. Emitting shadow rays involves sending a ray from an origin to a defined point in space where a light source is known to exist. The transmission of these rays can be made more efficient by providing the ITU with a table of all possible light locations. With that table of light locations, a direction vector for rays to be emitted can be derived from an index into the table for a light location. Also, the origin for many shadow rays can be transmitted only once, because many shadow rays may need to be emitted for a single intersected primitive.

By way of further explanation, camera 1305 produces camera rays 1310a and 1310b, which respectively intersect primitives 1315a and 1315d at points 1320a and 1320d. Each of these intersections would be indicated to shaders 1035. Shaders 1035 would cause rays 1335a, 1335c, and 1330b to be emitted for the intersection at 1320a. Ray 1335a is destined for light source 1340a, ray 1335c is destined for light source 1340c, and each such ray is illustrated as having no obstructions on a path to those lights, and therefore, point 1320a is not in shadow of another object for those lights. Ray 1330b was cast towards light 1340b, but is illustrated as intersecting object 1315b at point 1320b, such that the ray after that intersection is represented by a dashed line.

As illustrated, each of rays 1335a, 1335, and 1330a share a common origin, and have directions from that origin to different, known light sources. Therefore, their directions can be specified by indexing to a table or other compilation of locations of the light sources, rather than specifying a location of the light source in 3-D space. Also, since the shadow rays emit from a common origin, that common origin can also be provided as shared ray data. A similar situation is illustrated for camera ray 1310b, which intersects object 1315d at point 1320d. Rays 1335b and 1335d are cast towards lights 1340b and 1340c, and do not intersect another object, allowing determination that the point 1320d is not in shadow for those lights. However, ray 1330a is destined for light 1340a, but intersects object 1315c at 1320c, allowing determination that point 1320d is in shadow of object 1320b. Here again, these shadow rays are destined for respective lights, and originate from a common origin, allowing the common origin to be represented as shared ray data, and each ray direction indicated by an index to a list of light sources and their respective locations.

The above example ray types and ways to increase efficiency of transmission and storage of them could be implemented in fixed function circuitry of receiver 1050, for example. Such circuitry may interpret data from sample processors 1010 and shaders 1035 through buffer 1040. For example, a header received at receiver 1050 may include information specifying a format for interpreting other data as a plurality of rays of one of the above identified types. Such a header may include information identifying a ray type, which can be an appropriate number of bits to account for the ray types supported. Other information can be a number of rays for which data is about to be transmitted. Still other information transmitted may include information that identifies a portion of data to be received as ray data shared or otherwise common among the plurality of rays, and another portion of data to be received as ray data individual to each ray. For example, where rays are emitted from a common origin, as in reflection rays, a portion of data identified in the header may be for the common origin, and another portion of data identified in the header may be for a direction of each reflection ray in the group, or in other cases, a formula and/or parametric definition for the ray directions. Thus, using a header, or other transmitted configuration information, in these implementations would allow flexibility for ray data specification, by for example, allowing for different precisions of numbers specifying ray directions.

A related variation and generality on the example of shadow rays can include situations where rays are emitted and destined for a common location, but may have a variety of origins. A first example of this would include a situation where a number of primitive/ray intersections have been identified that each need to be tested for occlusion of a particular light source. A plurality of rays can represent shadow rays for testing occlusion of that light source at each ray/primitive intersection. Another example is where multiple points of an irregular or variable (or both) surface are to have rays emitted in a direction towards a known light source. Such an example is presented where sun-light illuminated water is being viewed. Rays from many portions of the water would be emitted in the direction of the sun. Thus, the origins of such rays would vary, but the destinations of the rays would be substantially similar. The origins may also be specified parametrically and/or with an element of (pseudo)randomness, reflecting for example, an effect of wind on the surface. Other variations of these examples are possible and one generalization is that where a surface or object is exposed to lighting from a given light source, but the interaction of the light and the surface would vary with position across the surface, then a plurality of rays can be expressed as a group destined for that light source, and may also have a parametrically or randomized origin.

Still further aspects include situations where objects other than light sources are a destination for many different rays. For example, a lens may concentrate rays from a field of view, and primitives involved in ray intersections within that field of view may have rays generated that share a destination on a surface of the lens. More generally, these are examples of situations where at least a destination among a plurality of rays is shared, and which can therefore be represented with ray data shared among that plurality of rays. From these disclosures other situations in accordance with these circumstances may be envisioned.

In other implementations, information that may be specified in the header can be hard-coded, such that a start bit sequence can identify a beginning of ray data, which can have pre-arranged bit positions thereafter for various types of common and shared portions of information for specifying the plurality of rays. In some implementations, a number of rays specified for a given header may be fixed or otherwise implicit.

The above example implementations can be provide some flexibility through data interpretation, such as interpreting header data, and would generally be appropriate for systems where types of rays for intersection that will be more efficiently represented are determined in advance (other ray types can be represented by fully defining an origin and direction for each ray, without usage of a shared ray data). However, more programmable and flexible implementations can be provided. A more programmable implementation, for example, may provide support for constructs that allow addition of: different camera behaviors, variation in sampling and distribution techniques for occlusion rays and Monte Carlo rays. Completely different types of rays may also be supported. Also, other types of common and separate ray data can be programmably configured.

For example, it was described above occlusion rays can use a table of known light sources, such that separate ray data can include indexes to the light sources, rather than a full-precision, three-space coordinate for the light. Another implementation might provide for a distribution function for light sources such that the receiver 1050 would use the distribution function to generate light source locations that are then sampled for occlusion from an identified intersection. And in such an example, the distribution function would be part of the portion of information transmitting the separate ray data. Such an example indicates that the techniques discloses are not limited to the examples provided, or the example ray types provided, but can be applied and adapted more generally for efficient transmission and specification of ray data of whatever type and form desired. Such adaptation and application can be assisted by provision of a programmable resource in receiver 1050.

Such a programmable aspect is illustrated with respect to FIG. 1C, which provides a processor 180 that receives ray information through buffer 1040, and which also communicates with memory resource 181 (e.g., a stack or a larger, fuller function memory resource) to store data during ray reconstruction. Reconstructed rays are output through ray output 190.

The above description primarily concerned transmission of rays from sources of the rays, such as a sample unit or shader code. However, increased efficiency of storage of rays can also be provided. For example, concerning ray transmission, receiver 1050 was illustrated, in FIG. 10A, as receiving inputs from sample processes 120 and Shaders 1035, and outputting rays as fully specified origins and directions to memory 912 via connection 1052, or to intersection testing resource 1045. In some implementations, memory 912 may also provide ray information directly to intersection testing resource 1045 via connection 1053.

Certain intersection testing unit implementations may benefit from conserving ray memory, in the intersection test unit. If this is the case the rays can be stored in their compressed form (e.g., stored as shared and individual data representations), and decompressed prior to performing intersection test. This yields memory savings in exchange for some extra expenditure of computing resources. For example, FIG. 10A illustrates that in such a ray storage example, receiver 1050 make both read and write data to/from memory 912 via connection 1052. Thus, receiver upon first receiving rays may store them without modification in memory 912, and later retrieve them, perform reconstruction operations on them and output them through a ray output 1051. Ray output 1051 couples with intersection testing resource 1045 to provide it with ray data for intersection test. Receiver 1050 may also store some of the rays as received and may reconstruct other rays by determining their origins and directions from the received ray data directly for use in intersection testing.

Figure 15:
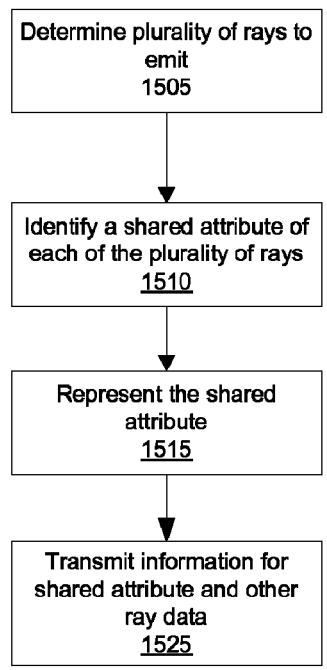
FIGS. 15 and 16 illustrate method aspects relating to efficient representation of rays to be transmitted for intersection test from a host to an ITU.

FIG. 15 illustrates a method implementable in host 905 (FIG. 10A) for producing data that efficiently represents groups of rays, such as groups of rays according to the example ray types above, and transmitting that data, for example, to intersection testing resource 1045. Method 1500 includes determining 1505 a plurality of rays to emit. For example, sample process 1010 can determine to emit a group of camera rays. The method also includes identifying 1510 a shared attribute of the plurality of rays. For example, in the case of the group of camera rays, the shared attribute can be a position of the camera. Next, the method includes representing the shared attribute as data to be transmitted. The method concludes with transmitting the data representative of the shared attribute, and other data that is sufficient to determine the origins and directions of each of the group of rays.

The steps of determining 1505 and identifying 1510 were separately identified for the sake of description clarity. However, in many implementations, these steps may not be "observable" from a perspective external to a process determining to emit such rays, as a shader or sample process may determine to emit a group of rays, and in such determination, the step of identifying a shared attribute may be implicit, because the shader or sample process may express the group of rays in a shared attribute, plus separate ray data form. As such, the data transmitted representative of the group of rays may be outputted from a process determining such group of rays without much additional processing. In many cases, such an implementation would be preferable over outputting separate origins and directions for each ray of a group, and then identifying shared attributes among that group.

Figure 16:
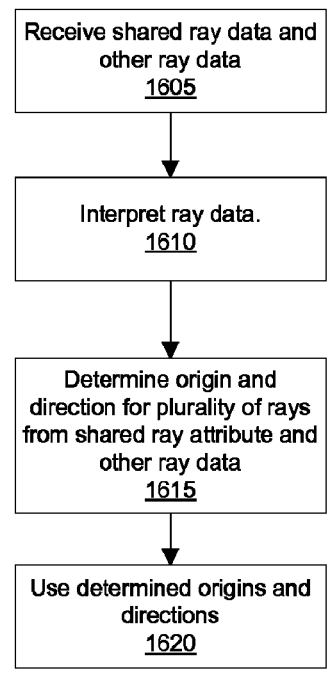

FIG. 16 illustrates a method, implementable at intersection testing unit 910 (e.g. in receiver 1050), for receiving data representative of groups of rays. The method includes receiving 1605 data from a ray data input (such as through buffer 138 to receiver 1050). The data comprises shared ray data and other ray data, as described above with respect to FIG. 15. The method also includes interpreting 1610 the data to identify the shared ray data and the other ray data, and determine 1615 origins and directions for each ray of the group of rays described in the data received. The interpreting 1610 and determining 1615 may be conducted within receiver 1050 and the actions taken by receiver 1050 for such interpretation and determination can vary based on the content of the data received and the implementation of these described aspects. For example, if the data received includes a header descriptive of the contents, then the receiver can identify the shared ray data, and interpret, for example, a ray type for the group, and use that ray type in determining 1615. Where more programmatic implementations are provided, then the data received can include instructions for programming portions of receiver 1050 as to how it should interpret the data received. The interpretation ultimately affects the determining step, since the determining is based on aspects, such as ray type, light source indexes, and any of a variety of other information used to make representing rays of such groups more efficient, as described above. The method may also include using 1620 the origins and directions determined for each ray of the group in intersection testing.

Processes and Systems Relating to Tracking and Controlling Rendering Progress

Although shaders 1035 is illustrated as a single entity in FIG. 10A, shaders usually are specific to materials, such as skin, hair, water, and so on. Shaders can refer more generally to any sort of procedure performed to determine a color of a primitive intersected in a scene by a ray. Shaders may also access texture data associated with the materials, which also would vary based on the material. Thus, shaders 1035 represent a general case where a number of different processes, each used in determining a color of a different primitive intersected by a different ray, may be running on host processor 905 at a given time.

Also, a shader may be programmed to call any number of standardized procedures, such as "get diffuse lighting." These standardized procedures can be used like a utility by the shader, which can use the results returned from the procedure in its own calculations and processes. As will be described below, these standardized procedures or other utilities used by shaders can be modified to implement adaptive ray tracing aspects described herein.

Sample process 1010 emits rays as an input for intersection testing resource 1045. These rays can originate from a camera position or any arbitrary origin in the scene. Sample process 1010 can determine to generate certain rays based on a variety of operations or calculations, such as operations to determine present scene quality or solution of certain lighting effects, that it performs. Sample process 1010 can also perform other operations, which can include, but are not limited to, calculation of the standard deviation of sample values with respect to neighboring samples, filtering of sample data with respect to neighboring samples, and adjustment and scaling of sample values and variety of 2D signal processing operations on the samples. Finally, sample process 1010 is configured to transform results of ray tracing calculations into final pixel color values for display, storage, and/or for other processing. As described above, intersection testing proceeds in the present system by testing collections of rays in parallel against one or more of GAD elements and scene primitives, where the device(s), or system performing the intersection testing need not be "aware" of the lineage of the rays it is currently testing, and in fact each ray of a collection may be unrelated in ancestry, origin, and direction to every other ray in the collection. This testing methodology is furthered by variations and adaptations to how ray tracing is typically managed, and how intermediate shading results factor into final color values for pixels, as explained below.

Intersection testing resource 1045 receives ray data from sample process 1010 and/or shaders 1035, and primitive data (and optionally geometry acceleration data) from geometry process 1020. Intersection testing resource 1045 identifies which rays intersect which primitives, and sends indications of such ray/primitive intersections to shaders 1035. Of course, FIG. 1 represents an abstraction for discussion purposes, and actual implementations may provide different behavior. For example, such indications may be provided to a driver that instantiates a process (which may be called a shader) to determine a color of the primitive identified in the indication.

Host processor 905 is also illustrated as running a management process 1018, which can be used in an implementation of ray tracing adaptations according to described aspects. In some implementations, management process 1018 may not be provided, as its functionality may be incorporated into shader processes, or other processes, as evidenced from description below. Host processor 905, in management process 1018 or another suitable process or implementation, operates to determine which rays to provide to intersection testing resource 1045, or at least an ordering of such rays, where a bandwidth between host processor 905 and intersection testing resource 1045 is not sufficient to transmit all such rays simultaneously. In particular, sample process 1010 and shaders 1035 may each generate rays for transmission to intersection testing resource 1045. Management process 1018 may cause rays from shaders 1035 to be prioritized for transmission to, and hence testing in, intersection testing resource 1045. For example, shaders 1035 may be generating groups of rays, and sample process 1010 also may be generating a group of camera rays, and the groups of shader rays would be preferred by management process 1018 (or another implementation) to the camera rays. This preferential treatment helps to enhance production and testing of secondary rays (i.e., rays other than camera rays) traveling in the scene. Production of a wide variety of secondary rays, according to aspects disclosed herein, is generally to be encouraged and stimulated. In other aspects such preferential processing of groups of shader rays to camera rays may be implemented elsewhere, such as in a receiver for an intersection testing resource.

Context concerning how most ray tracing systems operate may be helpful for understanding the following description. Conventionally, intersection testing and shading for ray tracing proceeds by building a tree of identified intersections between rays and scene primitives, where the tree represents chains of child rays spawned to determine a color of a primitive at a point of intersection. For example, a ray is emanated through a pixel of a 2-D representation being rendered. The ray is tested for intersection in the scene until a closest intersection with a primitive is identified. Then, child rays may be spawned to sample diffuse and specular lighting conditions, and/or to determine whether a known light source is occluded by another object, such that the intersection point is in a shadow of that object. Some of these rays, such as diffuse and specular lighting child rays, can themselves intersect other objects, and in turn spawn further child rays.

In other words, in many cases, a shader for a primitive cannot determine a color of the intersected primitive without having information that must be obtained from results of additional shading calculations for other primitives or light sources in the scene, which involves further intersection testing to identify those primitives and light sources.

Such a process usually continues for each spawned ray until that ray either leaves the scene or hits a light source. For those rays that hit a light source, that light source can then be sampled to determine a color of the light from the source, which then determines the color of the ray. Then, the chain of intermediate intersections may be recursed, such that at each juncture, a present color of the ray, with results from shading of the next primitive determines a color of the next ray in the chain, until the ray that originally emanated from a pixel is reached, and then the contribution of that ray to the color of that pixel can be determined. At each shading step, a vector describing a color of incoming light may be multiplied by results from shading in order to determine a color of outgoing light for use at the next intersection in the tree.

Such a method requires storing all the intermediate intersections involved in each chain of rays in the tree, so that the tree can be recursed during closure of the shading calculations for each node in the tree. For example, data associated with an intersected primitive may indicate that the primitive has a rough, reddish surface, and shaders 1035 (or some shader process instantiated, and considered among these shaders) have access to that data. However, shader 1035 would not have information about what color of light was incident on that primitive, and shader 1035 would not be able to determine what color the primitive should be, with respect to the ray which intersected it, until further intersection is done to determine diffuse and specular light, for example.

A different approach is to consider that each intersection can be independently resolved from the other intersections, if at each intersection, results of shading calculations can be considered additive rather than multiplicative. In exemplary aspects, a way to accomplish making intermediate shading results additive involves carrying a color attenuation vector with each ray emitted by either sample process 1010 or by shaders 1035. This attenuation vector tracks how each intersected primitive affects light from one or more sources that land at the intersection point of the ray and the primitive.

Thus, a ray data structure is provided for each ray that also includes the sample origin to which that ray will contribute and a color attenuation vector. With this information, it can be determined at any intermediate point during intersection testing to what pixel that ray contributes and how predecessor intersections have affected the color of that ray (which is in a reverse order of how the light actually propagates in the scene, and how ray/primitive intersections affect such light).

In such a system, sample process 1010 may maintain a sample buffer 1011 (or multiple sample buffers) that represents colors of pixels as presently accumulated (i.e., as each child ray completes, its contribution is reflected individually in the sample buffer, without propagating up the tree). Also, sample process 1010 may maintain a status of the rays in flight, as well as what information about pixel colors has been received at a given time from shaders 1035 during rendering of a scene.

FIG. 17 depicts an example of a data structure 1700 for representing a ray, and components of the data structure 1705, 1710, 1715, 1720 include sample identification 1705, a ray direction 1710, a ray origin 1715, a color attenuation vector 1720, and a weight 1725.

In a convenient example, the color attenuation vector can be represented as attenuation from a pure white color in a color basis being used to represent colors during ray shading, so long as the numbers have a relationship which can be used to determine how a path of the ray from camera to the present ray would affect a color of light traveling along that path. Such color bases may use RGB or any other basis found useful or desirable. For example, considering the convenient example of RGB, pure white could be represented as [1 1 1], and may include a number of zeros reflecting the precision of the calculation scheme being used. Because RGB is a well-known color basis, it is used in describing some examples and aspects, but no aspect is limited to usage of RGB, as any other color basis can be used, including additive and subtractive color bases.

FIG. 18 is used to explain aspects of how such color vectors can be used during ray tracing. The elements of FIG. 18 include a camera 1805, a color filter 1820, and lights 1840 and 1830. In the physical world, light emitted from lights 1840 and 1830 hits color filter 1820, is filtered by color filter 1820, and then some of the filtered light continues on to hit camera 1805 (an image plane between camera 1805 and primitive 1820 is emitted in this example for simplicity). Ray tracing operates in reverse, such that a camera 1805 emits a ray 1810 for intersection testing. Ray 1810 intersects a color filter 1820 at a primitive 1815. Most conventional ray tracing operates by annotating this intersection as a node in a tree of intersections. Then, program code (e.g., a shader) causes child rays 1825 and 1835 to be emitted to test a color of light sources 1840 and 1830 and to determine whether these light sources are occluded (because this example is simplistic, many intervening ray/primitive intersections that would usually occur are omitted). In an RGB color basis example, if the child rays 1825 and 1835 hit respective light sources 1830 and 1840, then a color of each light (e.g., say light 1840 is blue and light 1830 is red) is propagated up the tree to the node representing the intersection of ray 1810 and primitive 1815. Then, the effect of the ray 1810/primitive 1815 intersection on the light of each light 1840 and 1830 is determined, which in turn determines a color of light to propagate back to camera 1805. Assuming that color filter 1820 were cyan, color filter 1820 would filter out the red light and allow the blue light at a possibly reduced intensity.

In present aspects, camera 1805 emits ray 1810, and associated with the ray 1810 is a color attenuation vector, which upon emission from camera 1805 may be initialized as a pure white, e.g. [1 1 1]. Ray 1810 hits primitive 1815. Again, assuming that color filter 1820 is cyan, color filter 1820 physically would behave in the same manner as before. However, in present aspects, it is determined what affect color filter 1820 (at primitive 1815) would have on a color of light arriving at primitive 1815 in advance, and that effect, along with the effects of other previous ray/primitive intersections, is represented in the color attenuation vector "carried" with the ray. Specifically, in this example, color filter 1820 is cyan, while the color attenuation vector of ray 1810 is white, so the affect of color filter 1820 on ray 1810 will be to filter out red light. This effect is recorded in the attenuation vector by reducing the red component. For example, in the RGB basis (Red Green Blue) color basis, the attenuation vector of ray 1810 may start as [1 1 1]. An effect of primitive 1815 on such vector may be represented as [0 1 1], reflecting elimination of the red light.

This updated color attenuation vector is then associated with child rays 1825 and 1835. Again, child rays 1825 and 1835 respectively hit lights 1830 and 1840. Colors of lights 1830 and 1840 were assumed to be red and blue, respectively. The attenuation vectors of child rays 1825 and 1835 represent how their ancestry (i.e., path from camera ray to the present) would affect camera light such that red is filtered out. Thus, light 1830 is determined to have no contribution to the color of light at camera 1805, while light 1840 is blue, and thus, the color of light arriving at camera 1805 would be blue. This determination can be effected by directly writing the color determined to a sample buffer, e.g., screen buffer 111. Stated differently, in these aspects, a ray can be viewed as a channel representing a differential attenuation of different colors of light in different proportions.

In a different example, assuming that both lights 1840 and 1830 were white, then child rays 1825 and 1835 would "arrive" at their respective lights, with the information that their ancestral path causes filtering of red light (attenuation vector [0 1 1]). Thus, contributions to the scene (i.e., to the pixel) light energy, for both lights 1840 and 1830, would be cyan, and such contribution would be written back to sample buffer 211 (assisted by the fact that with each child ray 1825 and 1835 there also is information specifying to what screen pixel each ray contributes).

In more complicated and realistic situations, there may be a number of intermediate ray/primitive intersections which affect the color attenuation vector of each respective ray involved in the intersection. However, the color attenuation vector for each ray maintains a history of how its path would affect a color of light which may travel on that path.

A variety of example adaptations and ray tracing modifications according to these disclosures use this form of light energy accounting. Any of these examples and implementations may use multiple sample buffers, and rays may be separately collected in each such sample buffer, and may move between sample buffers. As previously mentioned, any color basis found useful or desirable for a particular type of ray tracing or other circumstance.

In the first example describing how light energy is accounted for in these aspects, there was an example where a cyan color filter was intersected with a camera ray in a scene with two lights—one red and the other blue. Because it can be known in advance that the cyan color filter would filter out red light hitting it, a process that has information concerning colors of the lights in the scene, as well as the effect of primitive 1815 (of color filter 1820), can determine not to issue a child ray to determine whether the red light is occluded by an intermediate object, such that primitive 1815 is in shadow of the red light, because the red light would largely be filtered out anyway, making it irrelevant whether or not primitive 1815 was occluded. Thus, an amount of rays issued for intersection testing in a scene can be reduced by not issuing rays whose ultimate contribution can be determined to be lower than a threshold. The circumstances for such situations may be most applicable to a simplistic light occlusion situation.

Of course, in more complicated materials, there may be some refraction and reflection that may cause some red light to come from primitive 1815, such that occlusion may be of some interest. The existence of such a situation is determined by a shader for primitive 1815, which, in these exemplary aspects, generates child rays for each indicated situation (e.g., reflection and refraction) and also records a strength or importance of each such situation as a weight in the respective child rays. For example, if a reflection from color filter 1820 were very slight, then a child ray for reflection may be emitted with a much lower weight than the weight associated with ray 1810 (aspects such as specular versus diffusiveness can be handled similarly). The weight thus represents a relative importance of a given ray to the shading of a particular primitive as well as to a camera ray from which it ultimately owes its existence (and to a sample to which it maintains a reference). Thus, intelligent real-time adaptation of ray tracing can be implemented using the weights.

In the context of FIG. 2, intersection test resource 250 returns an identified intersection between ray 1810 and primitive 1815, a shader for primitive 1815 issues child rays, and describes a relative contribution of each child ray to the affect of the primitive on light that would hit the primitive. These relative contributions can be represented by providing each child ray with a weight based on the weight of ray 1810. Also, in exemplary aspects, an effect of each child ray's parent may be represented in the weight of each child. For example, the weight of ray 1810 can be allocated among the child rays, such that the sum of weights of the child rays is about equal to the weight of ray 1810. Then each child ray can also be intersection tested, and the shading/weighting process repeated.

FIG. 19 illustrates a simplistic example of a camera 1905 emitting a ray 1910 that intersects an object 1920 at a primitive 1915. Determinations as to whether rays should be culled can be handled in a scalable and general manner with the example aspects presented below.

A shader associated with primitive 1915 determines to emit child rays 1930*a*-1930*e*. The shader for primitive 1915 would at least indicate a relative contribution for each of child rays 1930*a*-1930*e*. Also, to effectively account for the relative contribution of each child ray child rays 1930*a*-1930*e*, and also to maintain a fixed energy ratio among the rays that will contribute to a sample, the weight associated with the ray 1910 is used in determining respective weights for each child ray child rays 1930*a*-1930*e*. A number of the rays emitted in this example could be computed as a Fresnel term. In an example of weight distribution, the weight of ray 1910 is conserved such that the weights of child rays child rays 1930*a*-1930*e* sum to about the weight of ray 1910. Such additional weight modifications can be considered part of the shader or as a process that receives inputs from the shader. Summing of such weights is not required, and shaders can assign weights in any of variety of ways, such that a weight of a ray being shaded is not reflected or otherwise entirely propagated to child rays and/or contributed as energy to a sample.

Weights of rays emitted from a particular sample may be made to, sum to, or otherwise relate to a weight associated with the sample itself. The weight associated with the sample may be used to track an amount of light energy left to be accumulated for a particular sample/pixel. For example, if 10 camera rays were originally emitted for a sample, upon receiving color information for emissive primitives or lights accounting for 60% of the light energy, then the remaining sample weight may be commensurately reduced. A weight of a camera ray, as its ancestors are ray traced through a complicated scene, can become dispersed, such that many more rays may ultimately contribute to a sample than the number of camera rays originally emitted.

Prior to providing child rays for intersection testing intersection testing resource 1045, determinations concerning whether all child rays 1930a-1930e should be intersection tested can be made.

In an example aspect, the weight associated with each ray is used in determining whether that ray should be tested for intersection. For example, a rendering system according to described aspects may allow selection of goal priorities, such as scene quality, or rendering speed, such as a desired frame rate, for example. A weight threshold value for ray/primitive intersection processing can be set and periodically revised in furtherance of the prioritized goal. The threshold value may be used to determine whether a given child ray should be intersection tested or not.

For example, if rendering speed is prioritized, then maintenance of a desired frame rate is considered more important than achieving the best quality scene possible, although it is still desirable to retain as much quality as possible, within the parameter of frame rate maintenance. In such a circumstance, there may be more rays to process in a given timeframe that resources to process them, and so it may be desirable to avoid using processing resources on rays that have relatively low importance to a scene rendering, and in some examples, this importance is measured by a respective weight associated with each ray.

Returning to the example of FIG. 19, assuming that respective lengths of the arrows representative of the rays 1930a-1930e are representative of relative sizes of values of the weights associated with the rays, it may be determined that ray 1930e has a weight too small to merit further processing, and that ray can be abandoned rather than processed for intersection test. This example is of a situation where a shader for primitive 1915 does not receive information indicative of a priority (e.g., render speed) during rendering, and can run without such considerations. However, shaders can be written that allow inputs of weighting information that can be used to determine how many rays should be instantiated by the shader (as opposed to instantiation, and then culling of them).

Also, shading algorithms can be selected based on a weight of a parent ray (e.g., a shading algorithm that results in emission of child rays 1930a-1930e) can be selected based on a weight of parent ray 1910. If parent ray 1910 has a relatively high weight, then it can be deemed relatively important to the scene being rendered. A weight for a given ray can be judged based on statistical sampling or tracking of ray weights. For example, sample process 210 can track distributions of weights currently being intersection tested by for example maintaining a moving average of such weights, or bins of how many rays are within certain weight brackets, or some other acceptable means to understand a distribution of ray weights.

For example, several algorithms having a range of computation cost and quality of results (presumably, a direct relationship) may be available to perform a certain lighting function, and if parent ray 1910 has a relatively higher weight, then a computationally more expensive, but better quality algorithm may be selected for shading that primitive.

By further example, in other situations, a number of different lighting effects may be taken into account when determining a color of a particular primitive intersected, such as specular lighting, reflection, and refraction. In such circumstances, one or more types of child rays may be generated for each lighting effect. Each such child ray would have a weight associated with it, the value of which would be determined based at least on the weight of its parent ray (e.g., ray 1910.) Here also, a weight of ray 306 may be conserved, such that a sum of weights of all the child rays sum to about the weight of ray 306. How the weight of ray 306 is distributed among the child rays can vary.

For example, if a shader determines that a specular light accounts for 20% of a total light effect at primitive 1915, while diffuse lighting accounts for 50%, and refraction accounts for the other 30%, then the child rays emitted for each effect (specular, diffuse, and refraction) may as a group be assigned about 20%, 50%, and 30% of the weight of ray 1910. Among each ray, the weight assigned to the group may further be equally subdivided. Other divisions are possible as well. For example, a weight for some rays of the diffuse lighting component can be more heavily weighted than other diffuse lighting rays. Statistical, pseudorandom, and/or random distribution of weights may be implemented. Where this shader is for a primitive of a surface that emits light as well interacting with it, some portion of the parent ray weight may be added or otherwise accounted for as being determined at the sample. In other words, because the primitive emits light, at least some portion of the light energy propagated on the parent ray would be from that emission, and can be added to the sample at that time. Such addition can include tracking a color and a relative amount of energy represented by that color, as well as blending a current color of a sample with the light energy to be added, to arrive at a current updated color.

By coordinating the assignment and interpretation of weights associated with rays, rendering system 1000 allows for a wide variety of adaptive ray tracing behaviors relating to quality and speed of ray traced images, such that rendering system 1000 can use system resources in ways that efficiently maintain subjective and objective scene quality. Rendering system 1000 can also implement adaptations in ray tracing behavior to track to certain goals, such as maintenance of a minimum frame rate, as available resources for ray tracing fluctuate.

Another adaptation within the ambit of described aspects includes a diluting or concentrating of the importance of already issued rays. For example, 10 camera rays could be emitted that would contribute light energy to one pixel, and each could be directed to sample portions of the scene spaced apart at regular intervals. If a few of these rays run directly into a large primitive (e.g., a wall), then some of the camera rays may be unnecessarily. Because weights for the camera rays generally are determined in view of a number of rays emitted, if some of these rays are desired to be cancelled, the effect of the remaining rays should be commensurately increased. Such increase can be done by increasing weighting of color contributions for camera rays that already have completed, and when other rays complete, these can also be weighted more than their original sample weights would suggest. Otherwise, the rays could be identified in a storage area and their weights commensurately increased to account for the cancellation of some of the other camera rays. Such concentration functionality can apply to any situation where a number of similar rays were issued, but subsequently there is a determination that fewer rays are necessary to result in an acceptable quality rendering within the time and/or in view of other resources available.

Such functionality can also work in the obverse, where it is determined for one reason or another that more rays should be emitted to refine a color of a sample. Such a determination can result from identifying that more processing resources are available than otherwise thought or where results are found to be insufficiently accurate given a complexity of the scene being rendered (perhaps variances between colors returned from similar rays are too large, for example). In such a case, more rays can be emitted from a given sample, and weights for colors of rays that already were contributed to that sample can be commensurately reduced. Weights for rays being intersection tested can be adjusted if the rays are accessible where stored, or appropriate adjustments to the ray weighting can be done after each ray completes processing and returns color information. Thus, in these aspects, light energy may already have been contributed to a sample (e.g., in response to encountering an emissive shader) for some rays that reference that sample, and the relative importance of the light energy contributed by those rays may be adjusted after such contribution to implement an adaptation to the ray tracing affecting that sample.

As described above, ray weights need not be strictly conserved, such that shaders may not propagate to child rays or contribute light energy that sums to an amount of light energy that may be represented by a ray being shaded. Thus, although ray weight may be conserved or approximately conserved in some examples, implementations do not necessarily need to provide such functionality, and in some cases, not providing such functionality may avoid computation associated therewith, which may be a consideration in some implementations.

Another example of how ray tracing adaptivity during ray tracing is provided with respect to FIG. 20. FIG. 20 illustrates a source 2005 of ray 2010 and ray 2011. Ray 2010 directly intersects object 2025 (at a primitive not identified) while ray 2011 directly intersects object 2020 at primitive 2015. Each intersection would be indicated to a shader process, as described above. The ray 2010 directly intersects object 2025, the shader for that object (or perhaps more particularly, the shader for the surface of object 2025 at the primitive intersected) runs and may generate a ray 2055 for testing specular lighting from light 2050 (e.g., a surface of object 2025 can be somewhat shiny). The shader for this ray/primitive intersection may also generate other rays or request other calculations such as diffuse lighting. More complicated surfaces may also have additional rays generated for additional aspects like subsurface scattering, which may require generation of additional rays. A significance of described adaptability aspects will be described after further description of the ray/primitive 2015 intersection.

Ray 2011 intersects object 2020 at primitive 2015, which would cause a shader for primitive 2015 to run. For this example, assume that object 2020 is composed of a glass, such that a shader for object 2020 would generate both a transmission ray 2030 for tracing as well as a reflection ray 2031. In this example, the shader would cause a weight associated with ray 2011 to be used in determining a respective weight for each of ray 2030 and ray 2031. Given the reasonably direct incidence of ray 2011 to a surface normal of object 2020, the shader would likely assign a higher weight to transmission ray 2030 than to reflection ray 2031. Reflection ray 2031 then would be traced and it would be determined that it also intersects object 2025 at a back side. Now, because a weight of ray 2011 was divided (for example) among ray 2031 and ray 2030, the weight for ray 2031 would be smaller than a weight of ray 2010 (generally the case, if for example, both ray 2011 and ray 2010 are camera rays). The physical effect of this situation is that there may be a slight reflection of the back side of object 2025 in object 2020, while the portion of object 2025 intersected by ray 2010 is visible directly from ray source 2005.

Thus, a shader process for ray 2010/object 2025 intersection may have access to the weight associated with ray 2010, and in one example, would be able to determine, based on the associated weight, that accurate shading is required, and would operate accordingly to determine accurately more aspects of lighting that affect a color of the object. By contrast, the shader for the intersection of object 2025 and ray 2031 (could be another instantiation of the same shader process) would also see that ray 2031 is associated with a much lower weight, and in response, might only perform a diffuse lighting call, and completely forgo more computationally expensive ray tracing.

Alternatively, each shader process could operate the same, regardless of incoming ray weight, and then management process 130 could cull rays based on weights associated with the rays outputted from each shader process. Either implementation can provide adaptivity according to these aspects, because relative sizes of weights emitted from each shader process (e.g., specular rays from each shader process) in the management process 130 implementation would still reflect that a weight of respective parent rays (2010 and 2031) were different, with ray 2010 having a higher weighting. However, an aspect of these example implementations of note is that a measure of importance of the ray to the scene can be referenced by a shader process or by a management process to modify how much effort should be expended to accurately determine a color at the point intersected by that ray. A convenient implementation is to use a weight carried with a data structure representing the ray (e.g., FIG. 17), where that ray is divided among child rays for that ray (e.g. child reflection and child transmission rays) to maintain continuity of relative importance of the parent rays.

Figure 21:
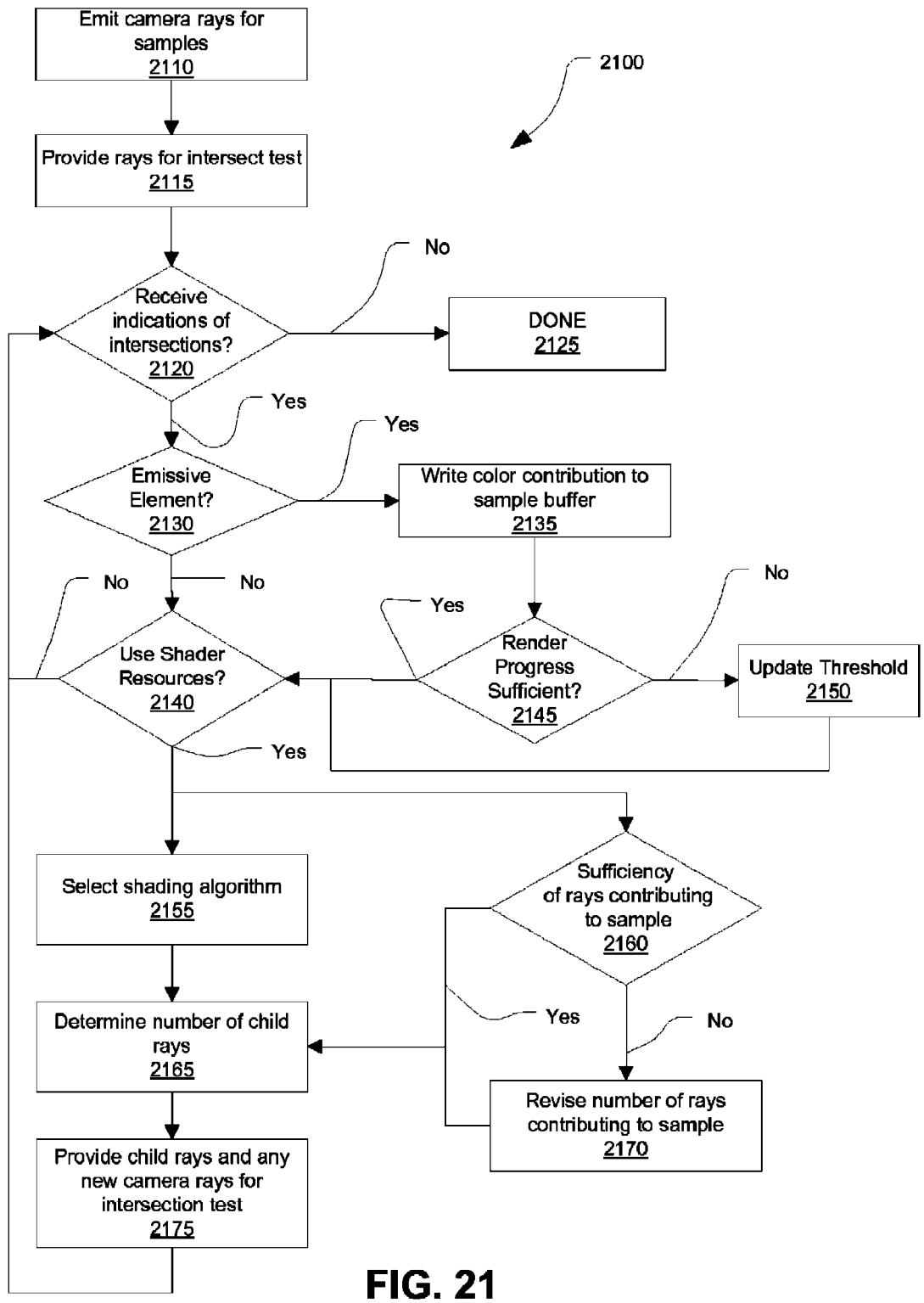
FIG. 21 illustrates an example method that incorporates ray tracing adaptivity aspects described with respect to FIGS. 18-20.

The following example method 600 depicted in FIG. 6 summarizes the example adaptations outlined above, which included for example ray culling, dilution, concentration, and selection of shading algorithms based on ray weights. Multiple of these aspects are illustrated in the method of FIG. 21, but any of them can be used in isolation or in a sub-combination.

Method 2100 includes emitting (2110) camera rays from samples, and providing (2115) those rays for intersection testing. Method 2100 then includes receiving indications of identified intersections (2120), and upon receipt, it is determined (2130) whether the primitive or other element (e.g., a light) intersected is emissive, and if so then a color contribution is written (2135) back to the sample buffer location identified by the ray identified in the intersection. If the element is not emissive, then it is determined (2140) whether to use shader resources in shading the ray/primitive intersection based at least in part on the weight associated with the ray. If resources are to be used, then a shading algorithm is selected (2155) based on the ray weight, and an output of such algorithm may includes determining (2165) a number of child rays to be emitted for further intersection testing. The child rays are provided (2175) for further intersection testing. Potentially in parallel, it can also be determined (2160) whether there are sufficient rays contributing to a given sample (which are identified with the sample location identifications included in each ray) and if not then the number of rays contributing to the sample are revised (2170) either up or down depending on whether there was under or over sufficiency of rays. Any such new camera rays are then provided (2175) for intersection test.

If rendering progress (step 2145) was insufficient, then a threshold used in determining whether to use shading resources, and selecting shading algorithms can be updated, such that fewer rays are shading and/or more simplistic shading algorithms are used. If there was an "over" sufficiency, then the threshold can be lowered such that higher quality shading algorithms and/or more rays can be shaded, or more child rays emitted, etc.

In sum, the examples and aspects described provide mechanisms for adapting ray tracing at a granular level during rendering of a scene (e.g., a frame in a sequence of image frames). Such adapting can be done in furtherance of goals, whether default goals, or explicitly selected goals. The usage of weights associated with rays for use in determining importance of the rays to scene rendering provides an example of how a granular determination of ray importance can be made, and information for use in such determinations tracked from parent to child ray, and so on. However, other implementations for such importance tracking may be provided, and adaptive ray tracing may be based on these implementations.

To arrive at a rendered image, light energy ultimately is contributed to a sample associated with a ray (referenced with respect to steps 630 and 635 of method 600), in response to that ray encountering an emissive element, which generally would be any primitive associated with program code that causes emission of light. Thus, emissive elements may include examples such as a light with a lens or a television screen, where these items may reflect light from elsewhere, while also emitting light, and emissive elements thus are not solely emissive, but can have complex light interactions. Thus, a shader for an emissive element, when shading a given ray/primitive intersection, may cause light energy to be added to the sample associated with the ray, where that light energy represents an emissive component of that shader. The shader may also cause various other rays to be emitted, as described above. In some cases, the light energy represented by the emissive component and the other rays emitted can be about an amount of light energy represented by a parent ray, or it can be more or less, depending on a desired effect. Sample process 110 may track light energy added to each sample, such that it maintains data sufficient to determine a relative effect of newly added light energy to the color of the light energy already added. For example, sample process 110 may maintain a weight associated with the sample which tracks additions of light energy, and can for example be referenced to determine a relative effect of newly added light energy to what was already added (e.g., if a weight associated with an emissive component of a shaded ray is slight, while a lot of light energy already has been added to the sample associated with that shaded ray, then the color of that sample would not change much. In a different example, a weight of ray could be made by a shader to be larger than what might be expected; such a circumstance would be represented by an expectedly large effect of that ray on the sample, but would not violate any explicit or implicit requirement for implementing the ray weight contribution aspects disclosed herein.

As described in some detail above, adaptivity based on ray importance, and in more particular aspects, based on ray weight, can be implemented after emission of rays by a shader process, such that the shader process need not be aware or specifically consider importance of a given ray being shaded when determining, for example, how many child rays to emit for that parent ray. Sometimes, shaders can call common lighting calculation utilities, rather than duplicating that code. This can provide for increased shader portability and modularity. For example, shaders may call lighting utilities for diffuse and specular lighting calculations. These utilities may implement adaptations according to the above-described aspects. For example, these utilities may use ray weight information in determining what type of algorithm to use for its lighting effect, and may use a more accurate, but computationally expensive effect for more important rays. As can be discerned, the shader calling the utility need not be aware of how returned lighting information was calculated, and can simply use it.

Still further implementation variations can include a management process that receives shader process outputs, such as child rays that the shader process would like intersection tested. The management process may determine whether any, all, or some portion of these child rays should actually be intersection tested. The management process may have visibility to a system utilization, and can determine whether a current system utilization can support such intersection testing without causing detrimental effects. Such detrimental effects can include failing to maintain a frame rate goal, or intersection testing lower importance rays at the expense of higher importance rays, which may cause unnecessary rendering quality degradation in constrained resource processing.

In still further variations, a shader process can be passed information about current resource utilization, and the shader process can use that information in determining how the present ray/primitive intersection should be shaded, based also on an importance of the ray, as may be determined by a ray weight. Such usage information may be formalized in an API or function call, such that shader processes can obtain such usage information at appropriate times. As can be discerned, a variety of implementation possibilities exist for adapting ray tracing, even during intra-frame rendering. Some such implementations can rely more on centralized management of rays being shaded while others can distribute usage information more broadly, resulting in more decentralized control.

Another item of general applicability is that a shading algorithm selection for a given ray/primitive intersection can be based on importance of the ray, as well as indicia of result quality achieved by the algorithm. Sometimes, quality of results of a particular algorithm can depend on what type of ray tracing is being performed. For example, quality of results of such algorithms may depend on what outputs are of interest from the ray tracing being performed, and as such, any given shading algorithm may be judged to give a different "quality" of result in different circumstances. Therefore, such algorithms may also be associated with ranges of qualities or mappings of qualities to usages. Ratings of such algorithms also may relate to subjective versus objective quality assessments.

In some examples and aspects, some values, such as weights associated with rays, have been related to other values, such as a weight associated with a sample from which the rays were emitted (or in the case of descendents of camera rays, by inheritance of an associated sample from a parent ray) Any such numerical relationships can be additional, such that a sum of ray weights is about that of a sample weight, for example, or such relationships can be made more complex or less apparent without distinguishing the aspects described herein. Also, example disclosures relating to adaptation based on ray weights described adaptations based on a ray being considered, either for culling or to be a parent of additional child rays, or as a peer for rays further rays to refine a contribution of the ray. These examples focused on the weight of the ray being considered; however, aspects disclosed herein encompass adaptations based on ray weights in any generalized manner, such that a weight of a particular ray may not be considered in a particular instance for culling or other processing related to that ray.

Figure 22:
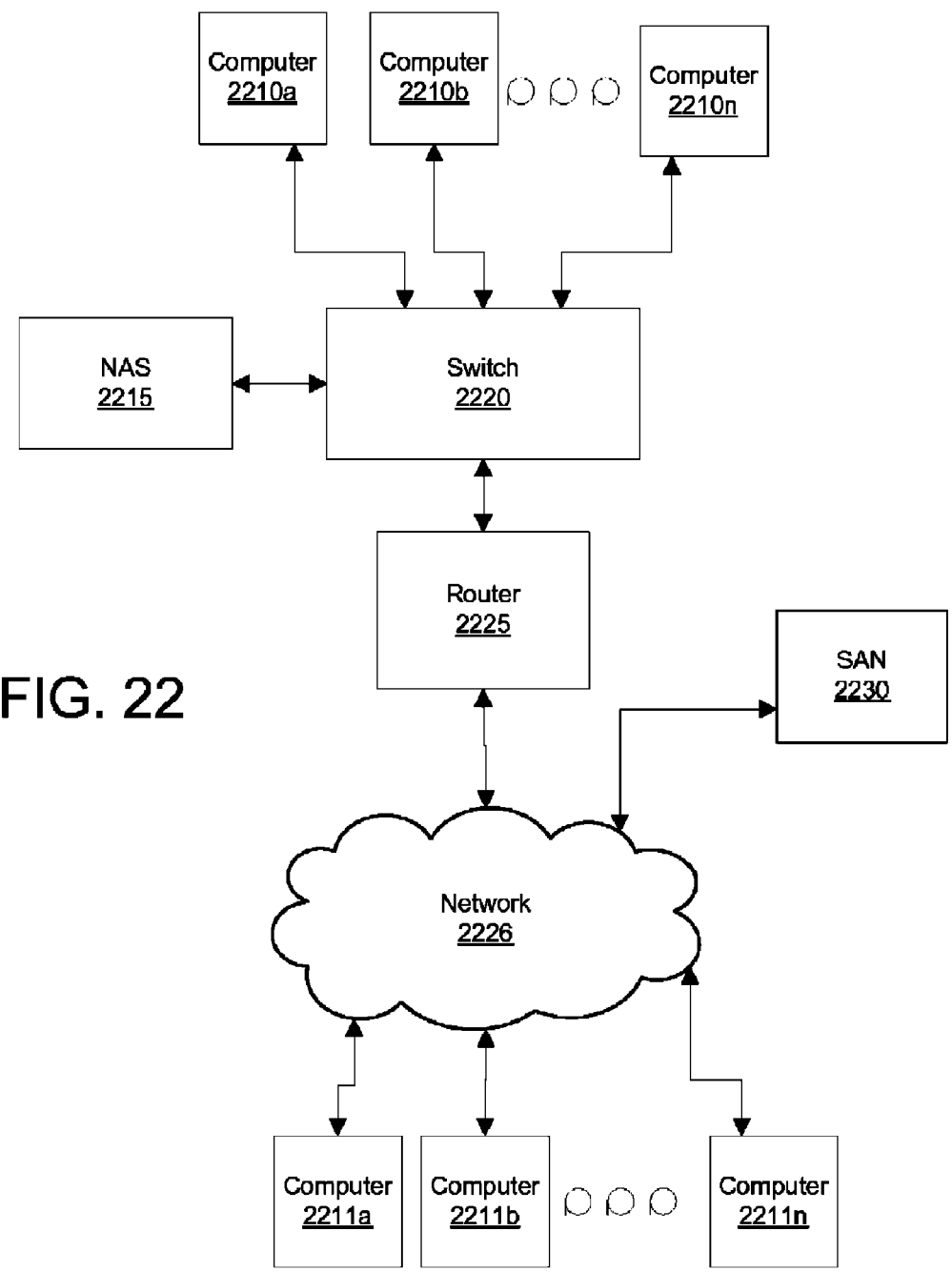
FIG. 22 illustrates a rendering farm that may use systems according to aspects described herein.

FIG. 22 illustrates a rendering farm 2000 comprising a plurality of computers 2210a-2210n, any subset of which, or all being equipped with hardware accelerator 910. The computers 2210a-2210n are connected on a LAN by switch 2220, which connects to router 2225 and to network area storage (NAS) 2215. Router 2225 connects to network 2226, which may be an internet, the Internet, a private network, or some combination thereof. Network 2226 provides access to storage area network resources 2230, and to other computers 2211a-2211n, which also may be equipped with hardware accelerators 910. Where a large amount of rendering is required, such a render farm may be employed to distribute rendering among multiple processing resources. Each computer illustrated can be provided a number of scenes to render and would use hardware accelerator 910 to accelerate such rendering.

In this description and in the following claims, a "network" may include one or more data links that enable the transport of electronic data between computer systems and/or modules. When information is transferred or provided over a network or another communications connection (either hardwired, wireless, or a combination of hardwired or wireless) to a computer, the computer uses that connection as a computer-readable medium. Thus, by way of example, and not limitation, computer-readable media can also comprise a network or data links which can be used to carry or store desired program code means in the form of computer-executable instructions or data structures and which can be accessed by a general purpose or special purpose computer.

Any of processing can be distributed over networks, such as local or wide area networks and may otherwise be implemented using peer to peer technologies and the like. Division of tasks can be determined based on a desired performance of the product or system, a desired price point, or some combination thereof. In embodiments implementing any of the described units at least partially in software, computer-executable instructions representing unit functionality can be stored on computer-readable media, such as, for example, magnetic or optical disks, flash memory, USB devices, or in networks of storage devices such as NAS or SAN equipment, and the like. Other pertinent information, such as data for processing can also be stored on such media.

Aspects of methods described and/or claimed may be implemented in a special purpose or general-purpose computer including computer hardware, as discussed in greater detail below. Such hardware, firmware and software can also be embodied on a video card or other external or internal computer system peripheral. Various functionality can be provided in customized FPGAs or ASICs or other configurable processors, while some functionality can be provided in a management or host processor. Such processing functionality may be used in personal computers, desktop computers, laptop computers, message processors, hand-held devices, multi-processor systems, microprocessor-based or programmable consumer electronics, game consoles, network PCs, minicomputers, mainframe computers, mobile telephones, PDAs, pagers, and the like.

Computer-executable instructions comprise, for example, instructions and data which cause or otherwise configure a general purpose computer, special purpose computer, or special purpose processing device to perform a certain function or group of functions. The computer executable instructions may be, for example, binaries, intermediate format instructions such as assembly language, or source code. Although some subject matter may have been described in language specific to examples of structural features and/or method steps, it is to be understood that the subject matter defined in the appended claims is not necessarily limited to these described features or acts. Rather, the described features and steps are disclosed as examples of components of systems and methods within the scope of the appended claims.

We claim:

1. A ray tracing system for rendering a 2-D representation of a 3-D scene composed of primitives, the system comprising:
    a processor configured for
        maintaining a sample buffer of accumulated data for a plurality of samples of a 2-D representation for a 3-D scene composed of primitives,
        outputting groups of rays for intersection testing, wherein the rays of at least some of the groups are specified by a shared attribute and individual ray data, wherein each ray is associated with a respective weight, and
        processing identified intersections between rays and primitives, the processing resulting in the outputting of at least some of the groups of rays, wherein a number of rays in at least some of these groups is determined at least in part by respective weights of rays identified as intersecting; and
    an intersection testing unit to
        receive the shared attributes and the individual ray data, and produce a respective origin and a respective direction for each ray,
        test the rays of the group for intersection with primitives composing the 3-D scene, and
        provide, to the processor, indications of any identified ray/primitive intersections.

2. The system of claim 1, wherein the intersection testing unit includes a non-transitory memory of sufficient size to store at least 10000 rays in flight, and is configured for receiving information defining the primitives, the rays retrievable from memory and the primitives providable to a plurality of intersection test cells without storage in an intermediating cache.

3. The system of claim 1, wherein the intersection testing unit is further operable to receive a plurality of geometry acceleration data (GAD) elements that respectively bound selections of the primitives composing the scene, and the intersection testing unit is further configured for intersection testing rays with the elements of GAD on a collection-by-collection basis.

4. The system of claim 3, wherein the elements of GAD are arranged in a hierarchical graph as nodes connected by edges, and rays of each collection are identified based on detecting an intersection between each ray and a parent node to a node associated with that collection.

5. A machine-implemented method for rendering a 2-D representation of a 3-D scene composed of primitives, the method comprising:
    accessing primitive information and surface information for a 3-D scene to be rendered from a non-transitory medium;
    determining a group of camera rays for intersection testing in the scene, each camera ray associated with a respective weight, and represented by data shared among the group, and individual data for that ray;
    determining a group of shader rays for intersection testing in the scene, each shader ray associated with a respective weight and represented by data shared among the group, and individual data for that ray;
    providing the group of camera rays and the group of shader rays to an intersection testing unit through an input; and
    in the intersection testing unit, determining an origin and direction for each ray of each group based on respective shared data and individual data, intersection testing the rays in the scene, and outputting indications of detected intersections between any ray and a primitive composing the scene, the indication including information for identifying the ray and the primitive involved in the intersection, wherein the determining of the group of shader rays is performed responsively to indications of detected intersections, and a number of shader rays in the group is determined using the weight associated with the ray identified in the indication.

6. A machine-implemented method for rendering a 2-D representation of a 3-D scene composed of primitives, the method comprising:

defining groups of rays to be tested for intersection with primitives composing a 3-D scene;

accepting the groups of rays in an intersection testing unit configured for parallelized testing of rays for intersection with elements of geometry acceleration data (GAD) and the primitives;

testing the rays of each group for intersection with GAD elements to disperse the rays of each group into a plurality of collections, each collection associated with an element of the GAD bounding a selection of the primitives;

tracking readiness of the collections of rays for further intersection testing;

scheduling testing for collections ready for further intersection testing, and on an as available basis, scheduling further groups of rays for intersection testing, the testing causing dispersal of tested rays into collections associated with elements of GAD that bound increasingly smaller selections of the primitives, and as primitives are identified that are bounded by a given element of GAD without an intervening GAD element, testing those primitives for intersection with rays of the collection associated with the given GAD element, and outputting indications of any identified intersection; and shading intersections identified by outputted indications, the shading causing generation of shader rays for further intersection testing, wherein collections may comprise one or more of camera rays and shader rays.

7. The machine-implemented method of claim 6, further comprising providing for acceptance a group of shader rays in preference to a group of camera rays.

8. The machine-implemented method of claim 6, wherein each group of rays and each collection includes no more than a maximum number of rays, and the intersection testing unit is configured for parallelized testing of at least that maximum number of rays for intersection with one or more of an element of GAD and a primitive.

9. The machine-implemented method of claim 6, wherein the intersection testing unit is configured to test rays of one collection in parallel with an element of GAD while also testing rays of a different collection in parallel with a primitive.

10. The machine-implemented method of claim 6, wherein each ray is associated with a sample and a respective weight, the weight indicative of the importance of the ray to the sample to which it is associated.

11. The machine-implemented method of claim 10, wherein a number of shader rays generated in response to an indicated intersection is determined at least in part by the weight associated with the ray identified in the indication.

12. The machine-implemented method of claim 6, wherein the GAD is organized as a hierarchical graph, where nodes of the graph represent elements of GAD, and which are connected by edges representing interrelation among the elements of GAD, leaf nodes of the graph bound primitives, and non-leaf nodes bound primitives with at least one intervening element of GAD.

13. A system for rendering a 2-D representation of a 3-D scene composed of primitives, the system comprising:

a processor configured for defining camera rays to be tested for intersection with primitives composing a 3-D scene, and for executing shading processes for identified intersections, the shading processes causing generation of shader rays also to be tested for intersection, for outputting the camera rays and the shader rays; and a processor configured for testing rays, on a collection-by-collection basis, for intersection with one or more of elements of geometry acceleration data (GAD) and the primitives, for accepting the outputted rays, for managing a memory resource storing the accepted rays, for maintaining a list of collections of rays available to be intersection tested, wherein collections of rays are associated with respective elements of GAD, and rays are added to a given collection in response to determining that such rays intersect the GAD element associated with that collection, for tracking readiness of the listed collections for further intersection testing, scheduling testing for collections ready for further intersection testing, and for commencing testing of rays of a scheduled collection, selecting the elements of GAD or the primitives against which such rays are to be tested, the selecting based on identifying elements of GAD interrelated to the element of GAD associated with the scheduled collection, and for outputting indications of identified intersections between rays and primitives.

14. The system of claim 13, wherein each ray may be tested against the primitives in an order different than an order that the ray would naturally traverse the scene, and the processor is further configured for maintaining a current closest detected primitive intersection for each ray.

15. The system of claim 13, wherein the processor is further configured for preferring output of shader rays to camera rays.

16. The system of claim 13, wherein at least some of the shader rays are outputted as a group, the rays of the group described by common attribute information and individual ray data.

17. The system of claim 13, wherein a number of shader rays outputted for shading an identified intersection depends on a weight associated with the ray involved in that intersection.

18. The system of claim 17, wherein the number of shader rays outputted also depends on an indication of progress in rendering the scene.

19. The system of claim 18, wherein the indication of progress at least represents a determination as to whether the rendering progress is sufficient to meet a rendering goal.

20. The system of claim 13, wherein accepted rays are initially assigned to one or more default ray collections associated with one or more elements of GAD that collectively bound the primitives composing the scene.

21. The system of claim 13, wherein the elements of GAD are interrelated in a hierarchical graph, where elements of the GAD are represented as nodes of the graph, and the identified elements of GAD include child nodes of the element of GAD associated with the scheduled collection.

22. The system of claim 13, wherein the non-transitory memory is operable to store a maximum number of rays, a collection of rays is full when it contains a number of rays about equal to a number of intersection test cells provided in the processor configured for maximizing throughput of ray testing by prioritizing scheduling of full collections of rays for testing, or accepting rays, and if throughput remains available after such priorities and the non-transitory memory is storing about the maximum number of rays, the processor scheduling collections of rays for intersection testing based on one or more of round robin, random, and pseudorandom selection.

23. The system of claim 13, wherein the processor is configured for prioritizing throughput of intersection testing by preferentially scheduling larger collections of rays for test, and secondarily encouraging longer term average throughput by stimulating production of shader rays of varying origins and directions.

24. A machine-implemented method for use in rendering a 2-D representation of a 3-D scene composed of primitives, the method comprising:
  determining a plurality of rays requiring intersection testing with primitives composing a 3-D scene, the plurality of rays including camera rays and rays generated during shading of identified intersections between rays and primitives;
  identifying a subset of the rays to test for intersection with a subset of the primitives, the subset of the rays identified based on determining that each ray of the subset intersects a geometric shape bounding the subset of the primitives, wherein the geometric shape and the subset of the primitives are retrieved from a non-transitory medium;
  outputting indications of intersections identified, each of the indications including information for identifying one of the rays and a primitive which that ray intersects; and
  shading the identified intersections in a processor, the shading generating rays for further intersection testing, and wherein a respective number of rays generated for each of the identified intersections is determined using an indication of importance of the ray identified by the intersection indication to a 2-D representation of the 3-D scene being rendered.

25. The machine-implemented method of claim 24, wherein the number of rays generated is further based on a determination whether sufficient progress has been made towards attaining a rendering goal.

26. A tangible article of machine readable media storing machine readable instructions for a ray-tracing based rendering method comprising:
  receiving an indication of a detected intersection between a first ray and a primitive of a plurality of primitives composing a 3-D scene;
  identifying an importance indication associated with the first ray;
  determining to emit, for intersection testing, a number of child rays of the first ray, the number selected using the importance indication; and
  representing the child rays with data comprising at least one attribute shared among the child rays, and data individual to each of the child rays; and
  providing the data representative of the child rays to an intersection testing resource for intersection testing of the child rays.

27. The tangible article of machine readable media of claim 26, wherein the method further comprises associating a respective importance indication with each of the child rays.

28. The tangible article of machine readable media of claim 27, wherein the method further comprises selecting respective weight values for the respective importance indications associated with each of the child rays, the weight values based at least in part on the importance indication of the first ray.

29. The tangible article of machine of claim 27, wherein each importance indication associated with the child rays is included in the data individual to each of the child rays.

30. The tangible article of machine readable media of claim 26, wherein the at least one attribute shared includes a type of ray.

31. The tangible article of machine readable media of claim 26, wherein the data comprising at least one attribute shared includes one of a common origin and a common direction for each of the child rays.

32. A rendering system, comprising:
  a processor configured to perform intersection testing between rays and objects, the machine comprising a ray input for inputting rays to be tested for intersection, an input for accepting geometry acceleration data (GAD) elements, an input for primitives composing a scene, and an output for indications of identified intersections between rays and primitives, wherein the processor is configured for accepting rays at the ray input, and collecting of accepted rays into respective collections, the collecting based on testing rays for intersection, and wherein such testing is commenced for rays of each collection responsively to determining that such collection is ready for testing; and
  a driver for interfacing with the processor, the driver comprising machine executable instructions stored in a tangible article of machine readable media, the instructions for accepting data representative of a scene to be rendered, formulating GAD elements based on the data representative of the scene, providing primitives to be intersection tested providing camera rays to be intersection tested in the scene, receiving indications of detected ray/primitive intersections, and arranging for shading of such intersections, the shading at times resulting in generation of secondary rays, wherein the driver prioritizes providing such secondary rays, when available, over providing camera rays to the processor for intersection testing.

33. The rendering system of claim 32, wherein the ray input, the input for accepting geometry acceleration data (GAD) elements, the input for primitives composing a scene, and the output for indications of identified intersections between rays and primitives are implemented using a PCI Express connection between a host computer configured by the instructions comprised by the driver and stored on the tangible article of machine readable media and the machine configured to perform the intersection testing.

* * * * *